United States Patent
Kahtava et al.

(10) Patent No.: US 10,425,146 B2
(45) Date of Patent: Sep. 24, 2019

(54) MOBILE COMMUNICATIONS NETWORK, METHODS AND BASE STATION FOR COORDINATING RELAY NODE ACCESS

(71) Applicant: SONY CORPORATION, Tokyo (JP)

(72) Inventors: Jussi Tapani Kahtava, Basingstoke (GB); Hideji Wakabayashi, Basingstoke (GB)

(73) Assignee: SONY CORPORATION, Tokyo (JP)

(*) Notice: Subject to any disclaimer, the term of this patent is extended or adjusted under 35 U.S.C. 154(b) by 28 days.

(21) Appl. No.: 15/552,595

(22) PCT Filed: Feb. 25, 2016

(86) PCT No.: PCT/EP2016/053942
§ 371 (c)(1),
(2) Date: Aug. 22, 2017

(87) PCT Pub. No.: WO2016/155953
PCT Pub. Date: Oct. 6, 2016

(65) Prior Publication Data
US 2018/0054248 A1 Feb. 22, 2018

(30) Foreign Application Priority Data
Mar. 27, 2015 (EP) ..................... 15161539

(51) Int. Cl.
*H04B 7/15* (2006.01)
*H04W 28/02* (2009.01)
(Continued)

(52) U.S. Cl.
CPC ........... *H04B 7/15* (2013.01); *H04B 7/15557* (2013.01); *H04L 47/24* (2013.01); *H04L 47/805* (2013.01);
(Continued)

(58) Field of Classification Search
CPC . H04B 7/15; H04B 7/15557; H04W 28/0268; H04W 28/16; H04W 24/10;
(Continued)

(56) References Cited

U.S. PATENT DOCUMENTS

2009/0219853 A1 9/2009 Hart et al.
2010/0167743 A1 7/2010 Palanki et al.
(Continued)

FOREIGN PATENT DOCUMENTS

| WO | 2016/102441 A1 | 6/2016 |
| WO | 2016/116289 A1 | 7/2016 |
| WO | 2016/135082 A1 | 9/2016 |

OTHER PUBLICATIONS

3GPP TR36.872 V12.1.0, "Technical Report $3^{rd}$, Generation Partnership Project; Technical Specification Group Radio Access Network; Small cell enhancements for E-UTRA and E-UTRAN—Physical Layer aspects (Release 12)," Dec. 2013, (100 pages).

(Continued)

*Primary Examiner* — Joshua Kading
(74) *Attorney, Agent, or Firm* — Xsensus, LLP

(57) ABSTRACT

A mobile communications network, method, and base station arranged to request and analyze measurement information from one or more infrastructure units including one or more relay nodes and one or more mobile communication terminals. The base station then sets forwarding rules in a relay node according to the measurement information reported so that the relay mode may forward any data received as soon as possible, or aggregate data over a period of time and only forward it once predetermined conditions have been met.

11 Claims, 11 Drawing Sheets

(51) Int. Cl.
*H04W 40/22* (2009.01)
*H04W 28/16* (2009.01)
*H04L 12/851* (2013.01)
*H04L 12/927* (2013.01)
*H04W 40/12* (2009.01)
*H04W 72/08* (2009.01)
*H04W 24/10* (2009.01)
*H04B 7/155* (2006.01)
*H04W 84/04* (2009.01)
*H04W 88/02* (2009.01)
*H04W 88/08* (2009.01)

(52) U.S. Cl.
CPC ....... *H04W 24/10* (2013.01); *H04W 28/0268* (2013.01); *H04W 28/16* (2013.01); *H04W 40/12* (2013.01); *H04W 40/22* (2013.01); *H04W 72/085* (2013.01); *H04W 72/087* (2013.01); *H04W 84/047* (2013.01); *H04W 88/02* (2013.01); *H04W 88/08* (2013.01)

(58) Field of Classification Search
CPC . H04W 72/085; H04W 72/087; H04W 88/02; H04W 88/08; H04W 84/047; H04L 47/24; H04L 47/805; H04L 43/08; H04L 65/80
See application file for complete search history.

(56) References Cited

U.S. PATENT DOCUMENTS

| | | | |
|---|---|---|---|
| 2010/0309837 A1 | 12/2010 | Yi et al. | |
| 2012/0236782 A1* | 9/2012 | Bucknell | H04B 7/155 370/315 |
| 2012/0244796 A1* | 9/2012 | Ando | H04B 7/155 455/7 |
| 2013/0273838 A1* | 10/2013 | Nagata | H04B 7/155 455/9 |
| 2014/0087736 A1* | 3/2014 | Shoshan | H04W 76/10 455/437 |
| 2017/0325243 A1* | 11/2017 | Yasukawa | H04W 48/08 |

OTHER PUBLICATIONS

Harri Holma, et al., "LTE for UMTS OFDMA and SC-FDMA Based Radio Access," John Wiley & Sons Limited, Jan. 2010, (4 pages).
3GPP TS 23.203 V12.7.0, "Technical Specification Digital cellular telecommunications system (Phase 2+'); Universal Mobile Telecommunications System (UMTS); LTE; Policy and charging control architecture," ETSI TS 123 203 V12.7.0, Jan. 2015, (224 pages).
International Search Report dated Jul. 20, 2016 in PCT/EP2016/053942 filed Feb. 25, 2016.

* cited by examiner

MOBILE COMMUNICATIONS NETWORK, METHODS AND BASE STATION FOR COORDINATING RELAY NODE ACCESS

CROSS-REFERENCE TO RELATED APPLICATIONS

This application is a National Stage of International Application No. PCT/EP2016/053942, filed Feb. 23, 2016, which claims priority to European Patent Application 15 161 539.0, filed in the European Patent Office on Mar. 27, 2015, the entire contents of which is being incorporated herein by reference.

TECHNICAL FIELD OF THE DISCLOSURE

The present disclosure relates to mobile communications networks, methods of controlling the communication of data in a mobile communications network, and base stations which can be arranged to request and analyse measurement information from one or more relay nodes and one or more mobile communication terminals. According to some embodiments the base stations can then determine the forwarding rules in a relay node according to the measurement information reported so that the relay node can forward any data received as soon as possible or aggregate data over a period of time and only forward the aggregated data once predetermined conditions have been satisfied.

Embodiments of the present technique can provide methods of communicating data in a small cell environment where relay nodes may be used.

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a number of new infrastructure architectures involving a variety of classes of devices, of wireless access point units and of applications which may require different data rates, coverage areas or transmission powers. Unlike a conventional third or fourth generation communications device such as a smartphone, an MTC-type terminal is preferably relatively simple and inexpensive, having a reduced capability. Examples of recent developments include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Other examples include relay nodes which provide assistance to local terminal communicating with a base station.

Whilst it can be convenient to have different systems addressing different needs from different mobile network users, the additions of new infrastructure and new services can also create an infrastructure problem, which is not desirable in a mobile network.

With the continuous growth in data transmitted in mobile networks, continually increasing network capacity comparatively is a problem faced by the industry. There are three parameters which can be changed in order to increase Radio Access network capacity: higher spectral efficiency, more radio spectrum and denser cell layout. The two former of these have limitations on the expected gains over today's LTE, and certainly improvements on the order of magnitude or more are not possible. Thus, in order to meet the stated 1000× capacity targets, small cells are getting a lot of attention [1].

An objective technical problem addressed by the present disclosure, then, is to increase network capacity through the employment of small cells and relay nodes. This in itself has its own set of challenges to overcome.

SUMMARY OF THE DISCLOSURE

According to an example embodiment of the present technique there is provided a mobile communications system, comprising a base station, which includes a transmitter and a receiver. The transmitter is configured to transmit signals in accordance with a wireless access interface to one or more communications terminals, and to transmit signals via the wireless access interface to one or more relay nodes, and the receiver is configured to receive signals via the wireless access interface from the one or more communications terminals, and to receive signals via the wireless access interface from the one or more relay nodes. Each of the one of more relay nodes includes a transmitter for transmitting signals representing data received from one or more of the communications terminals to the base station or to transmit data received from the base station to one or more of the communications terminals, and a receiver for receiving signals representing the data from one or more of the communications terminals for transmission to the base station or to receive signals representing the data for transmitting to the one or more communications terminals. The mobile communications system further comprises a controller operatively coupled to the base station, which is configured to receive from the base station measurement information comprising a relative quality of the communication paths measured by one of the communications terminals and a relative quality of the communication paths measured by each of the relay nodes, to determine from the measurement information an association between the communications terminal and one of the relay nodes, and to control the communications terminal to transmit the signals representing the data to the associated relay node for transmission to the base station and to receive the signals from the associated relay node which represent the data for transmission to the communications terminal transmitted by the base station.

The controller is configured to receive an indication of a capability of the communications terminal to transmit the signals representing the data and an indication of a quality of service of data to be transmitted via a communications bearer from the communications terminal and the base station, and to determine whether the communications terminal should transmit the data for the communications bearer to the associated relay node or whether the communications terminal should transmit the data to the base station via the wireless access interface, based on the quality of service indicated for the communications bearer and the indicated capability of the communications terminal.

The controller is further configured to receive from the base station measurement information comprising a relative quality of the communication paths measured by one or more other communications terminals, to determine from the measurement information an association between one or more the other communications terminals and the associated relay node, to receive indications of the UE capability parameters of the communications device and of a quality of service of data to be transmitted via a communications bearer from the one or more other communications terminals and the base station, to identify, based on the UE capability parameters of the communications device and of the quality of service of data to be transmitted via the communications bearers of the one or more other communications terminals and the communications terminal data which can be transmitted to the base station via the associated relay node, whether the communications terminal should transmit the data for the communications bearer to the associated relay node or whether the communications terminal should transmit the data to the base station via the wireless access interface, and if the data for the communications bearer of one or more of the communications terminal should be transmitted by the associated relay node, to aggregate the data from the associated communications terminal and the one or more other associated communications terminals, and upon predetermined conditions being met to transmit the aggregated data to one of the one or more additional relay nodes or to communicate the data to the base station via the wireless access interface.

When the size of cells is scaled down to have a smaller inter-site distance (ISD), the problem of interference from synchronisation signals and cell reference signals persists. The techniques of interference avoidance and management have been addressed from the very early LTE releases onwards, and have become more demanding in dense cell layout architectures. Small cell discovery is consequently impacted by the interference, and by the adoption of some of the solutions to manage interference, such as on-off mechanisms. Switching a small cell off is not a solution in a scenario where this will impact the uplink capacity and required user equipment (UE) transmission power, as well as modulation and coding schemes, dramatically.

The proliferation of MTC devices will introduce challenges of its own. When a huge number of MTC UEs in a cell transmit small payloads only occasionally, the management of those UEs directly by the eNodeB becomes cumbersome. Assigning uplink resources through individual resource grants to individual UEs consumes a lot of signalling resources, and fragments the uplink radio resource use. Similarly, independent random access channel (RACH) messages from numerous MTC devices would needlessly overcrowd that resource in the cell.

The present disclosure can provide an arrangement for setting up the forwarding rules in a relay node according to the capability information reported by a communications device as well as the quality of communications links in a mobile communications network. The arrangement can provide for the optimisations of communications in the network by aggregating data at a common gateway relay from devices with a particular capability, for example MTC devices, and forwarding data upon predetermined conditions being met, and by forwarding data from devices with a different capability which is not delay tolerant to the serving base station as quickly as possible, either directly or via one or more hops across relay nodes.

The present technique allows for less power consumption in a mobile network comprising a base station, a controller, one or more communications terminals and one or more relay nodes. Due to aggregation of data at the relay nodes through one or more hops from the communications terminals, fewer uplink transmissions are required in order for data from the communications terminals to reach the base station. The controller is aware which data transmissions are delay tolerant and may be aggregated at the relay nodes, and this data may be transmitted by, for example, MTC devices. The controller is also aware if data transmissions are not tolerant of delays, and using the forwarding rules set up as a result of the measurement information received, is able to instruct the network as to the fastest possible way of getting that data from communications terminal to base station.

The dense relay assisted network has been looked at in a number of co-pending European patent applications, namely EP14200168.4, EP15151967.5 and EP15156163.6, the contents of which are incorporated herein by reference.

Various further aspects and features of the present technique are defined in the appended claims, which include a mobile communications network comprising a base station, a relay node and a communications terminal, a method of operating a base station as a network controller, and a base station forming part of a mobile communications network.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
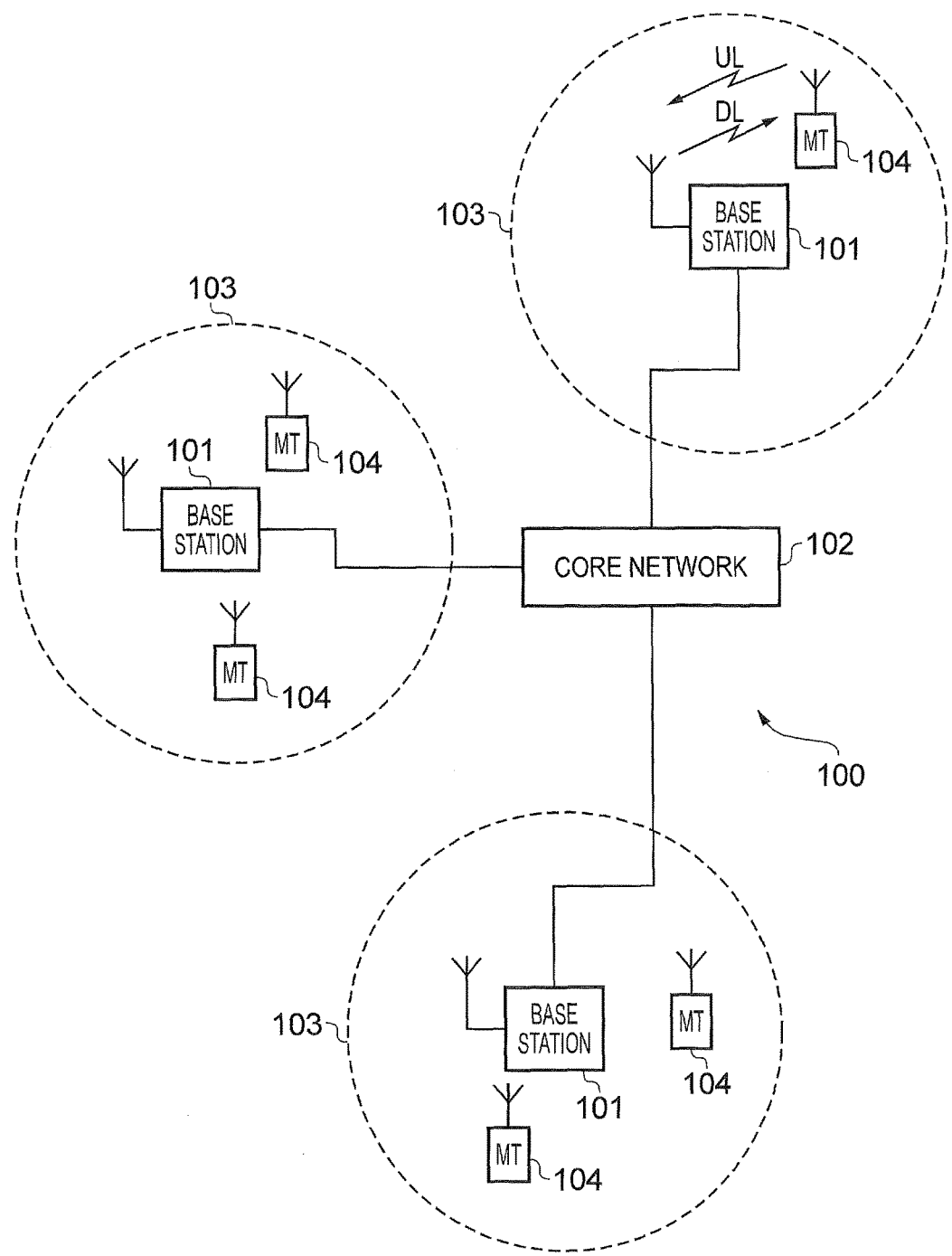
FIG. 1 provides a schematic diagram of a mobile communications system according to an example of an LTE standard.

Hereinafter preferred embodiments of the present technique will be described in detail with reference to the appended drawings. Note that, in this specification and appended drawings, structural elements that have substantially the same function and structure are denoted with the same reference numerals, and repeated explanation of these structural elements is omitted.

FIG. 1 provides a schematic diagram illustrating some basic functionality of a conventional mobile telecommunications network, using for example a 3GPP defined UMTS and/or Long Term Evolution (LTE) architecture. The mobile telecommunications network/system 100 of FIG. 1 operates in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [2]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that are licenced for use by the operator of the network 100. The core network 102 routes data to and from the terminal devices 104 via the respective base stations 101 and provides functions such as authentication, mobility management, charging and so on. The terminal devices may also be referred to as mobile stations, user equipment (UE), user terminal, mobile terminal, mobile device, terminal, mobile radio, and so forth. Base stations may also be referred to as transceiver stations/nodeBs/e-nodeBs/eNodeB, and so forth.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

The base stations 101 of FIG. 1 may be realised as any type of evolved Node B (eNodeB) such as a macro eNodeB and a small eNodeB. The small eNodeB may be an eNodeB such as a pico eNodeB, a micro eNodeB, and a home (femto) eNodeB that covers a cell smaller than a macro cell. Instead, the base station 101 may be realized as any other types of base stations such as a NodeB and a base transceiver station (BTS). The base station 101 may include a main body (that is also referred to as a base station apparatus) configured to control radio communication, and one or more remote radio heads (RRH) disposed in a different place from the main body. In addition, various types of terminals, which will be described below, may each operate as the base station 101 by temporarily or semi-persistently executing a base station function.

Any of the communications devices 104 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The communications device 104 may also be realized as a terminal (that is also referred to as a machine type communication (MTC) terminal) that performs machine-to-machine (M2M) communication. Furthermore, the terminal apparatus 104 may be a radio communication module (such as an integrated circuit module including a single die) mounted on each of the terminals.

In the present disclosure, a base station providing a small cell is generally differentiated from a conventional base station mostly (and sometimes exclusively) in the range provided by the base station. Small cells include for example the cells also called femtocell, picocell or microcell. In other words, small cells can be considered as similar to macrocells in the channels and features provided to the terminals, but with the use of less power for base station transmissions, which results in a smaller range. A small cell can therefore be interpreted as being the cell or coverage provided by a small cell base station. In other examples, the term small cell can also refer to a component carrier when more than one component carrier is available.

Figure 2:
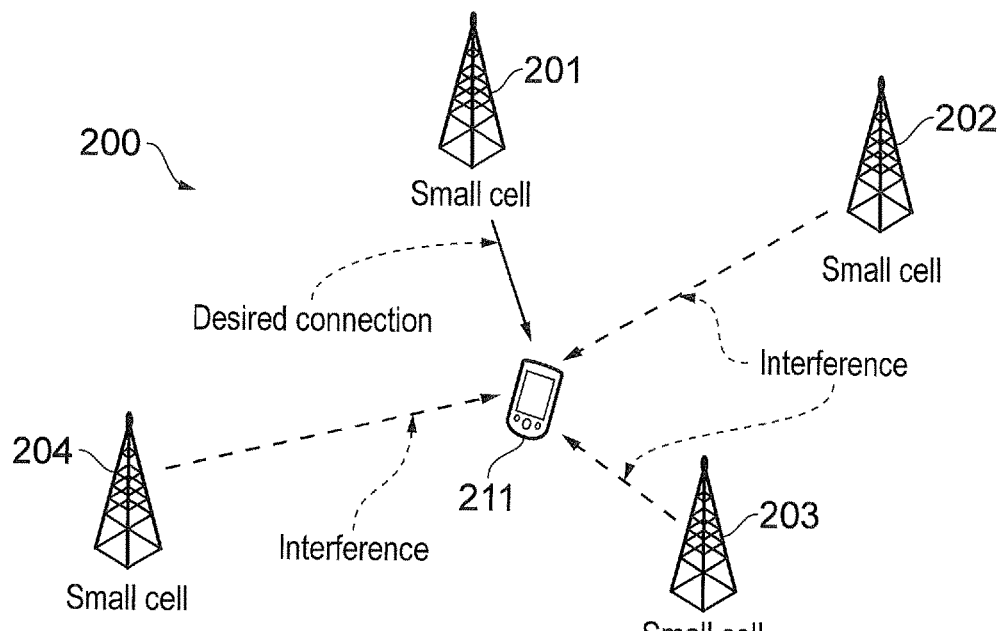
FIG. 2 schematically illustrates an example of a small cell environment.

FIG. 2 illustrates an example of a small cell environment 200 wherein a plurality of base stations 201 to 204 are operable to communicate with terminals, such as terminal 211. In this example, the terminal 211 is in communication with base station 201 providing a first small cell but is within the range of the small cell for each of base stations 202, 203 and 204. As a result, the signals sent by base station 201 to terminal 211 can suffer from interference from signals transmitted by base stations 202 to 204. While with conventional macrocell networks the same type of situation would also be likely, in practice, the mobile operator is in a position to carry out frequency planning, distributing frequencies amongst base stations in a static or dynamic manner. Accordingly, the level of interference can be significantly reduced for macrocells. On the other hand, when dealing with a small cell network, there may be a potentially very large number of base stations, each using different powers such that network planning becomes much more difficult, and the complexity also increases with the number of active small cells in an area. In particular, if a large number or small cells are available in an area, it is likely that they will not be able to each be allocated a different, non-overlapping frequency bands such that transmissions from different cells would not interfere with each other. Moreover, small cell networks have an additional difficulty that a small cell may be mobile, i.e. not stationary, while network planning for a macrocell or legacy femto/picocells was generally based on stationary or fixed base stations. This also increases a complexity of trying to reduce interference significantly. Of course, interference between small cells can be significant when a number of deployed small cells increases such that in a dense small cell environment, interference reduction can be challenging. As a result, in the event that the interference affects synchronization signals or reference signals of small cells, terminals may not even be able to discover and connect to small cells.

Figure 3:
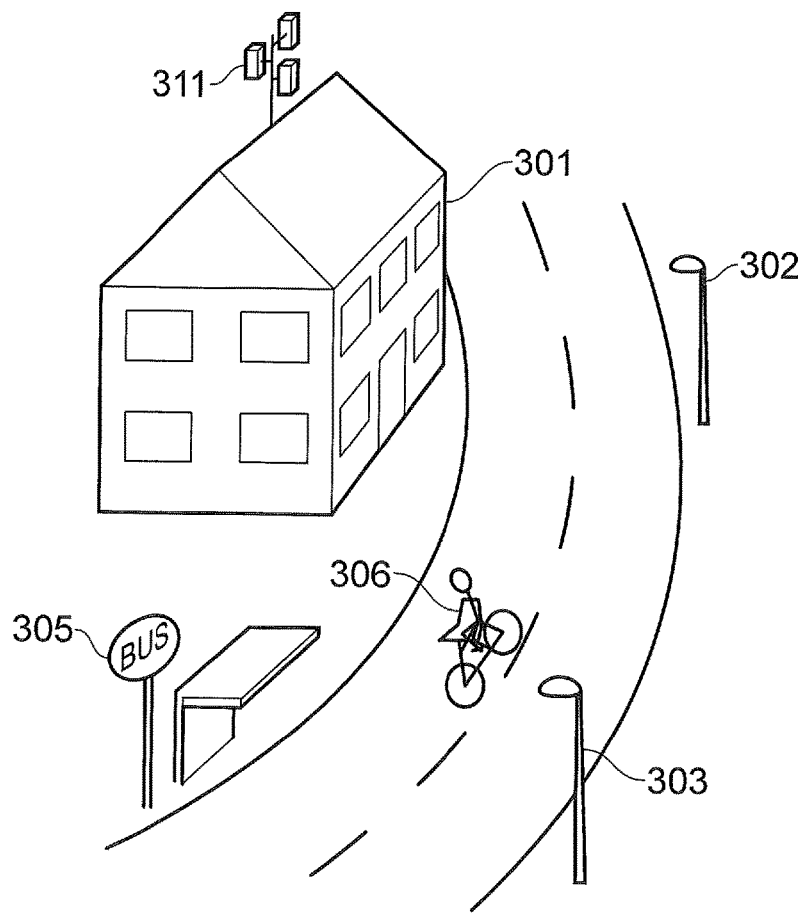
FIG. 3 illustrates another example of a small cell environment.

An example of a small cell environment 300 is illustrated in FIG. 3, where a macrocell base station 311 is provided in the same area as small cells provided by a base station 301 in or in the vicinity of a building, by a base station 302 in a first lamppost, by a base station 303 in a second lamppost, by a base station 305 provided in a bus stop and by a mobile base station 306 provided in a cyclist back-pack. In this example, planning for interference may vary depending on traffic and on time. For example a cyclist may enter an interference zone this zone. However, the base station 301, if serving an office, may potentially only be used during office hours and may be turned off during the rest of the day or the rest of the week. A variety of base stations may thus be providing a small or macro cell and the base station may have very different profile regarding time of use, frequency capabilities, power/range, additional functionalities, etc.

Figure 4:
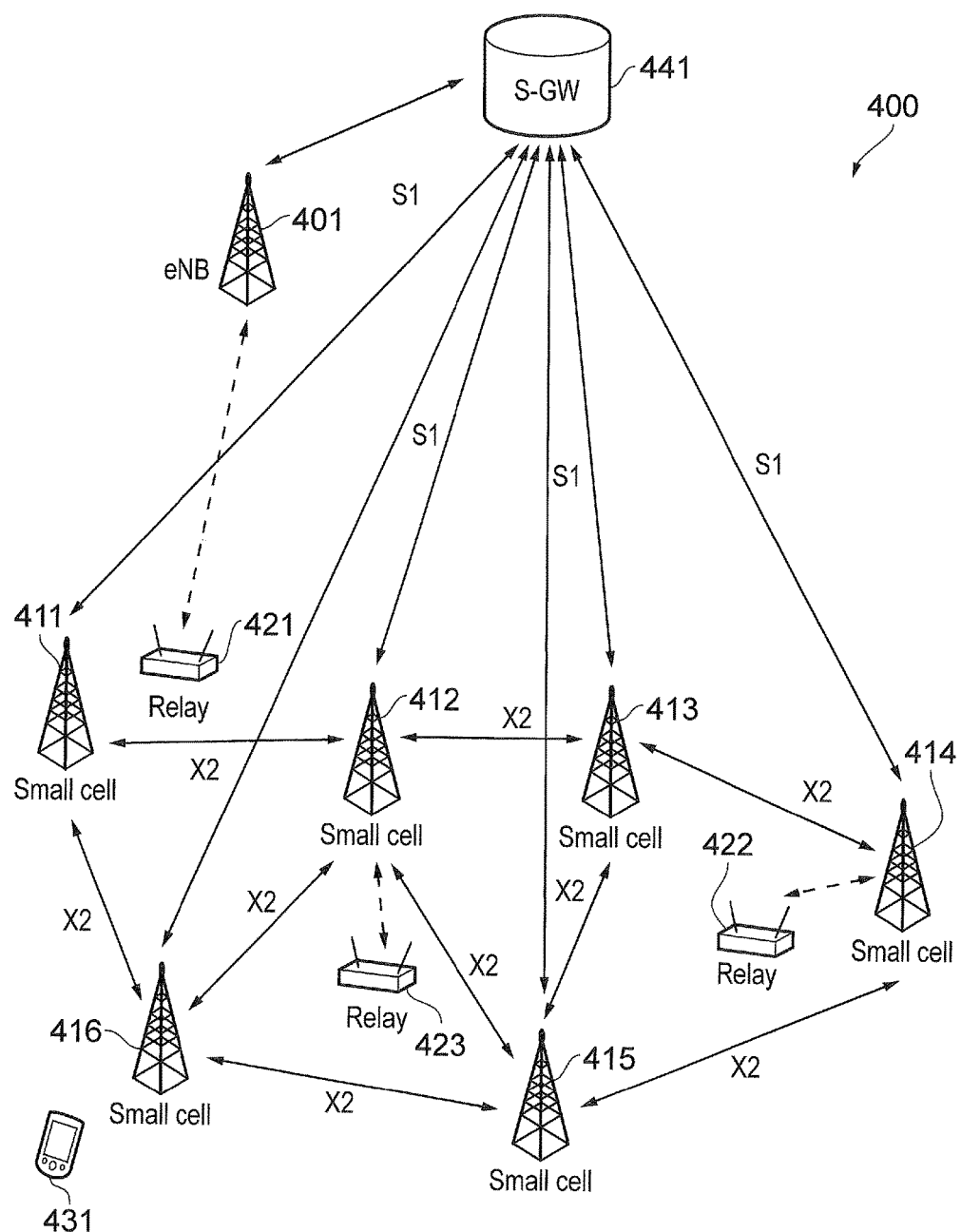
FIG. 4 illustrates an example system for communicating with at least a terminal in a heterogeneous network.

Moreover, mobile networks can also include relay nodes which can further increase the complexity of the mobile system and of the reduction of interference in a small cell network. FIG. 4 illustrates an example system 400 for communicating with at least a terminal 431. In this system 400, a base station 401 provides a macrocell and six base stations 411 to 416 provide small cell coverage, potentially overlapping with the coverage of the base station 401. Additionally, three relay nodes 421 to 423 are provided and are operating with base stations 401, 414 and 412, respectively. A relay node can generally be defined as a wireless radio access point for relaying transmission and which thus does not implement all of the functionalities of a base station. It is in general not directly connected to the core network but uses wireless access (inband or outband) for backhaul link to connect with a base station. In other examples, the backhaul link may also be provided over a wired connection. This is in contrast to a small cell base station which, as mentioned above, can generally operate like a base station and is thus connected to the core network, as illustrated by the arrows between the small cell base stations 411 to 416 and the Serving Gateway "S-GW" in FIG. 4. Relay nodes may also send or receive data with the terminals or base stations which can also add to the complexity of dealing with interference in an environment as illustrated in FIG. 4.

Relay technologies are known generally to provide an arrangement for receiving signals from a base station and for retransmitting the received signals to a UE in a mobile communications network, or to receive signals transmitted from a UE for re-transmission to a base station of a mobile communications network. The aim of such relay nodes is to try to extend a radio coverage area provided by a mobile communications network to reach communications devices which would otherwise be out of range of the mobile communications network or to improve the ratio of successful transmissions between a terminal and a base station.

3GPP LTE Release 10 introduced support for decode-and-forward relays, which are intended to extend network coverage or increase network density. The relay node is connected to a UE over an access link and to the eNodeB over a backhaul link. This backhaul link may be either inband with the access link or outband. In inband relaying, the backhaul and access links operate using the same spectrum resources. In outband relaying, the backhaul link operates in a spectrum separate from that of the access link.

For the reason of backwards compatibility to Release 8 and Release 9 UEs, the relay node must be available for these UEs to connect to. This was achieved in Release 10 by the relay appearing to the UE as if it were a conventional base station, known as Type 1 Relay in LTE specifications. A Type 1 Relay has its own cell ID, and for all means and purposes appears as an independent base station for the UEs around it. The Type 1 relay node itself, on the other hand, is seen as a UE by the serving eNodeB.

There is also the concept of a Type 2 relay, which refers to a relay node that does not have a cell ID and does not imitate a base station to UEs. In this case, the relay node is transparent to the UEs, which are unable to distinguish it from the serving cell itself.

Figure 5:
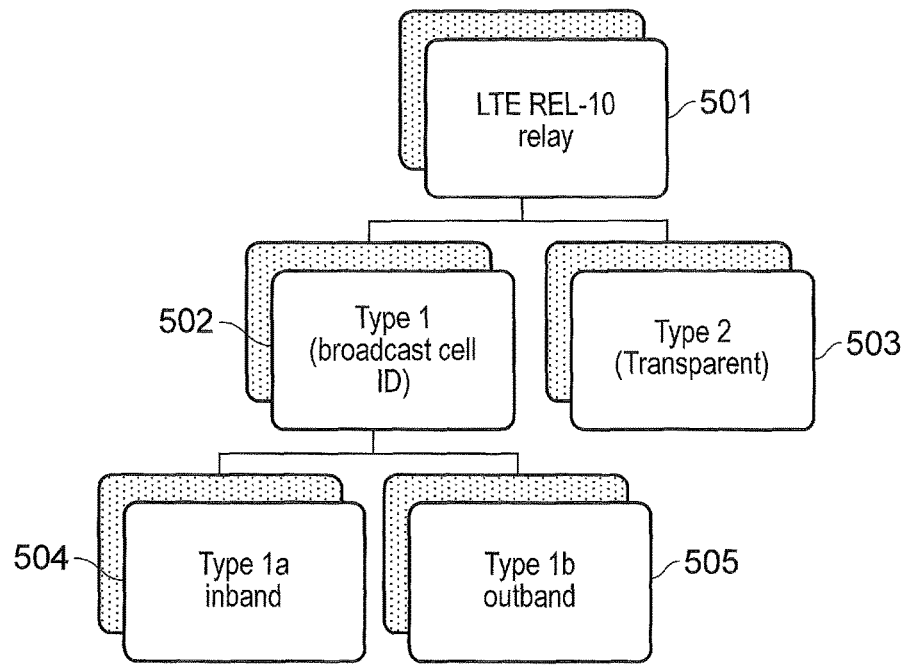
FIG. 5 illustrates an example of the current relay types in 3GPP LTE Release 10 and onwards.

FIG. 5 displays the current relay types in 3GPP LTE Release 10, and onwards. A relay node 501 in 3GPP LTE Release 10 can be either a Type 1 relay 502, which has its own cell ID which is broadcast to the UEs around it, or a Type 2 relay 503, which is transparent to the UEs. Further, in the case of the relay node 501 being a Type 1 relay 502, the relay node can be either an inband relay 504, where the backhaul and access links operate using the same spectrum resources, or an outband relay 505, where the backhaul link operates in a spectrum separate from that of the access link.

Some key concepts in LTE relevant to the present technique are the capability and category of the UE, as well as Quality of Service (QoS).

In LTE communication protocol, the parties (eNodeB and UE) exchange information on their capabilities so that neither party requests capability which is not supported by the other entity. Such capabilities may be the supported LTE release, supported frequency bands, the UE category and MIMO capabilities. In the LTE system, the mobile network informs on its capability via various system information block (SIB) messages, and the UE informs on its capability via a UE capability information report. Whenever the network wants to know the capability of a UE (most typically during registration) it sends a UE capability enquiry message specifying which information it would like to receive. The UE then has to report all of the capability information requested by the network.

TABLE I

LTE Bearer Quality Classes (TS23.203) [3]

| QCI | Bearer Type | Priority | Packet Delay | Packet Loss | Example |
|---|---|---|---|---|---|
| 1 | GBR | 2 | 100 ms | $10^{-2}$ | Conversational voice |
| 2 | | 4 | 150 ms | $10^{-3}$ | Conversational video (live streaming) |
| 3 | | 3 | 50 ms | | Online gaming (real time) |
| 4 | | 5 | 300 ms | $10^{-6}$ | Non-conversational video (buffered streaming) |
| 65 | | 0.7 | 75 ms | $10^{-2}$ | Mission critical user plane Push to Talk voice (e.g. MCPTT) |
| 66 | | 2 | 100 ms | $10^{-2}$ | Non-mission critical user plane Push to talk voice |
| 5 | Non-GBR | 1 | 100 ms | $10^{-6}$ | IMS signalling |
| 6 | | 6 | 300 ms | | Video (buffered streaming), TCP based services e.g. email, chat, ftp etc. |
| 7 | | 7 | 100 ms | $10^{-3}$ | Voice, video (live streaming), interactive gaming |
| 8 | | 8 | 300 ms | $10^{-6}$ | Video (buffered streaming), TCP based services e.g. email, chat, ftp etc. |
| 9 | | 9 | | | |
| 69 | | 0.5 | 60 ms | | Mission critical delay sensitive signalling (e.g. MCPTT signalling) |
| 70 | | 5.5 | 200 ms | | Mission critical data (e.g. example services are the same as QCI 6/8/9) |

The LTE UE categories are needed to ensure that the eNodeB can communicate correctly with the UE. By receiving the LTE UE category information at the base station, the network is able to determine the performance of the UE, and communicate with it accordingly. As the LTE category defines the overall performance and the capabilities of the UE, it is possible for the eNodeB to communicate using capabilities that it knows the UE possesses. Accordingly, the eNodeB will not communicate beyond the performance of the UE.

In the LTE system, QoS is applied on radio bearers between the UE and the packet data network (PDN) gateway (P-GW). This evolved packet system (EPS) bearer consists of a radio bearer (between the UE and eNodeB), an S1 bearer (between the eNodeB and serving gateway (S-GW)) and an S5/S8 bearer (between the S-GW and P-GW). The default bearer that is initially set up is always a non-guaranteed bit rate (Non-GBR) bearer, and it remains so as long as the UE is attached to the network. Any dedicated bearer will be an additional bearer on top of a default bearer, and can be either GBR or non-GBR. The bearers may belong to different QoS classes, which are identified by the Quality Class Identifier (QCI) as shown in Table I on the previous page.

Today's (3GPP LTE Release 12) specifications do not have bearer quality classes that would tolerate packet delays of above 300 ms. However, in general, a UE with latency tolerant data to send would not transmit that data unless its transmission buffer would start to become full. Once the UE chooses to request uplink resources for transmitting the data in its transmission buffer, the QoS class indicates what level of delay and packet loss is tolerated for the bearer.

OPTIMISATION IN THE NETWORK

According to an aspect of the present disclosure there is provided a controller for use with a base station which can be arranged to request and analyse measurement information from one or more infrastructure units, comprising one or more relay nodes and one or more mobile communication terminals. The base station can then set the forwarding rules in a relay node according to the measurement information reported so that the relay node may forward any data received as soon as possible, or aggregate data over a period of time and only forward it once predetermined conditions have been met.

Figure 6:
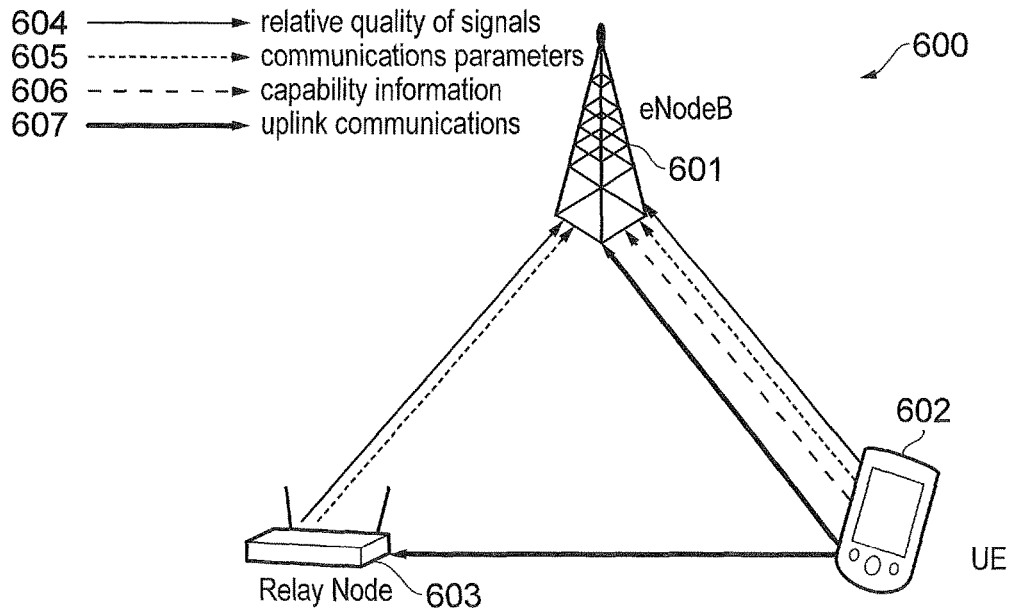
FIG. 6 illustrates an example mobile communications network in accordance with the present technique.

FIG. 6 illustrates a mobile communications network 600 in accordance with an arrangement of the present disclosure.

The network includes an eNodeB 601, which may serve as a controller for controlling transmissions, a mobile communication terminal, or UE 602, and a relay node 603, both of which are served by the eNodeB 601. The eNodeB 601 comprises a transmitter configured to transmit data across a wireless access interface to the UE 602 and the relay node 603, and a receiver configured to receive data from the relay node and UE 602 in return. The eNodeB 601 is configured to receive measurement information from both the UE 602 and the relay node 603. This measurement information comprises a relative quality of signals, indicated by the solid arrows 604, an indication of communications parameters (the QoS), indicated by the dashed arrows 605, and capability information of the UE 602, indicated by the longer dashed arrow 606. Based on analysis of this measurement information received, the eNodeB 601 decides whether it should instruct the UE 602 to communicate on the uplink with the relay node 603, or directly with the eNodeB 601 itself. These uplink communications are indicated by the double-lined arrows 607.

The present technique proposes to manage the relaying of traffic from different types of UE in the relay network by setting the forwarding and retransmission rules relevant to the session in question. For example, MTC UEs, when they engage in sessions transmitting delay tolerant, small packets of data, would benefit from being able to transmit at a very low power to the nearest relay node they are associated with. This relay node would then aggregate that traffic with traffic from other MTC UEs associated to it, and forward the aggregated data to the next relay node upon predetermined conditions being met. The predetermined conditions include identifying that the quality service requirement for the communications bearer can allow the data is delay tolerant to an effect that the data can be aggregated by the associated relay node. One relay node under the serving cell (typically the one with the best uplink link budget to the eNodeB) would be designated as the gateway through which all of this delay tolerant MTC traffic is forwarded. In effect, for these purposes, the relay network may be seen as a cloud which has anchor points at the top end towards the eNodeB, and anchor points at the bottom end for the UEs.

Figure 7:
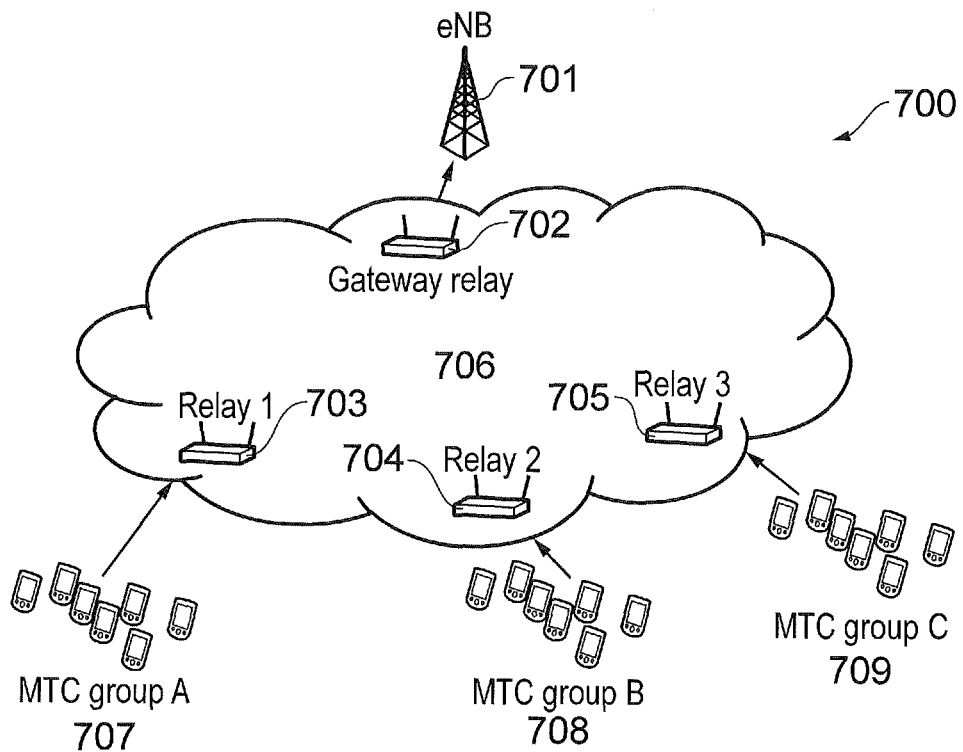
FIG. 7 illustrates an example of anchor points in a dense relay assisted network in accordance with the present technique.

FIG. 7 illustrates these anchor points in a dense relay assisted network 700 in accordance with the present technique. The network comprises an eNodeB 701 which has designated a relay node as the gateway relay 702. The network comprises three further relay nodes 703 to 705 as anchor points at the bottom end of the cloud 706, where the gateway relay 702 is an anchor point at the top end of the cloud 706. Each of the further relay nodes 703 to 705 as the anchor points at the bottom end of the cloud 706 has a number of UEs associated with it. In this example, the UEs are MTC devices, and are divided into three separate groups of UEs. The UEs in MTC group A 707 communicate data with the first relay 703, the UEs in MTC group B 708 communicate data with the second relay 704, and the UEs in MTC group C 709 communicate data with the third relay 705.

It is important to note that the relays in FIG. 7 by no means operate as coverage extension relays. All of the UEs would likely be camping under the serving eNodeB, and receive common downlink channels from it. An extension of the concept could of course cover UEs that are out of network coverage, but this is not relevant to the present disclosure.

For other types of UE traffic which would not tolerate delays and aggregation, the relay node that receives the UE data would try to forward the data to the eNodeB as directly and quickly as possible, either with direct uplink connection or via minimum amount of hops, and not necessarily via a designated gateway relay. There may also be situations in between these examples where the routing of user plane protocol data units (PDUs) via independent paths across relays brings network coding benefits.

Figure 8:
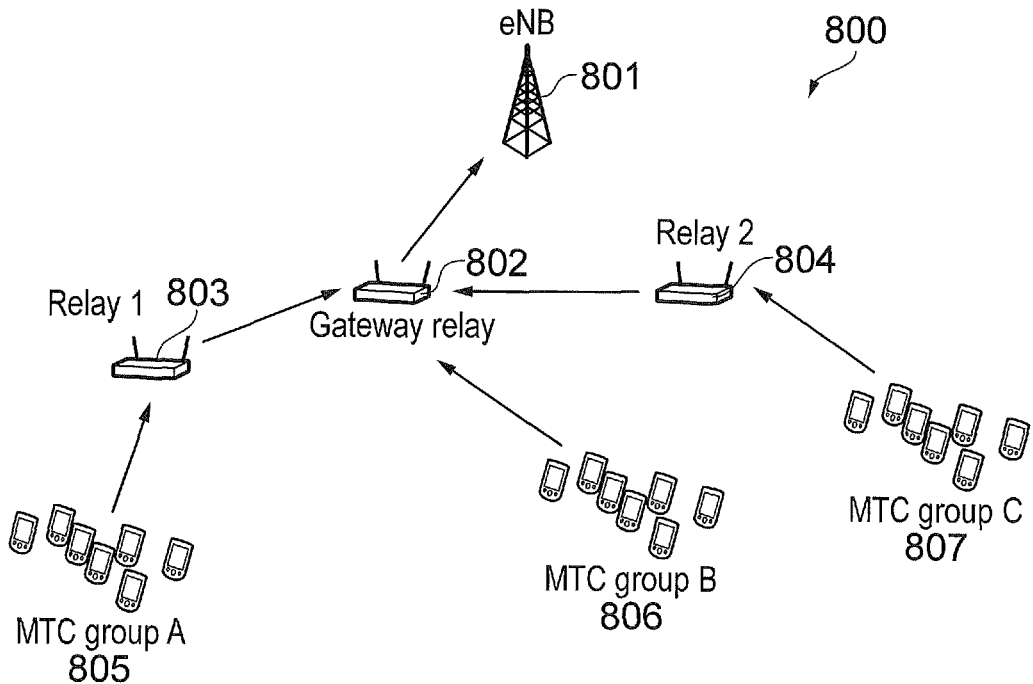
FIG. 8 illustrates an example in which transmissions may be aggregated through a gateway node in accordance with the present technique.

FIG. 8 shows an example mobile communications network 800 in accordance with the present technique where transmissions may be aggregated through a gateway relay node. This example mobile communications network is for the case where the network comprises communication terminals which transmit delay tolerant data, and the primary concern of the system is minimising overheads for the management of the communication terminals. The network comprises an eNodeB 801 which has designated a relay node as the gateway relay 802. The network comprises two further relay nodes 803 and 804, as well as three separate groups of UEs 805 to 807, which may be MTC devices. The UEs in MTC group A 805 communicate data with the first relay 803, the UEs in MTC group B 806 communicate data with the gateway relay 802, and the UEs in MTC group C 807 communicate data with the second relay 804. The first and second relay nodes 803 and 804 transmit data received from their group of UEs 805 and 807 to the gateway relay 802, which aggregates this incoming data with the data received from its own group of UEs 806, before transmitting the aggregated data to the eNodeB 801 concurrently upon predetermined conditions being met.

Figure 9:
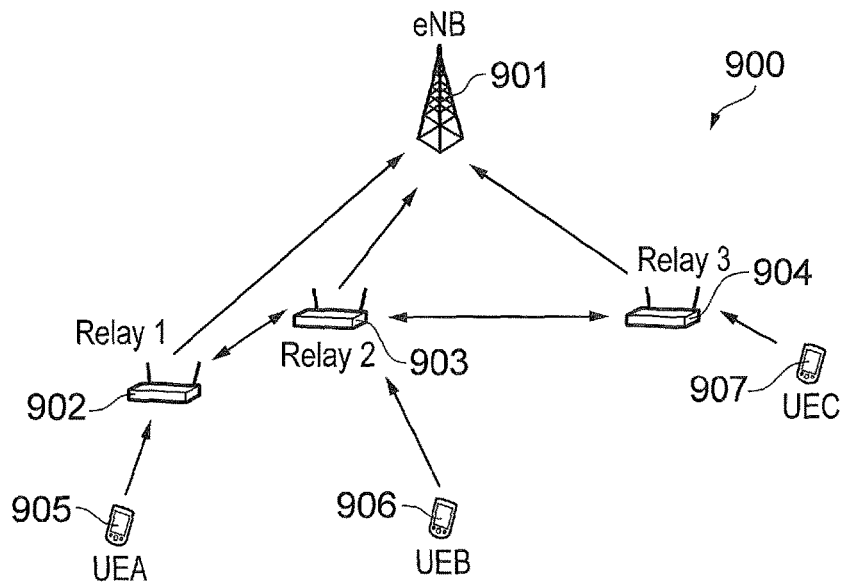
FIG. 9 illustrates an example in which transmissions may be set independently by each relay node in accordance with the present technique.

FIG. 9 shows an additional example mobile communications network 900 in accordance with the present technique where transmissions may be sent independently by each relay node. This example mobile communications network is for the case where the network comprises communication terminals which transmit data which is not delay tolerant, and the primary concern of the system is to allow the data to be communicated on the uplink to reach the serving eNodeB as quickly as possible. The network comprises an eNodeB 901 and three relay nodes 902 to 904, as well as three UEs 905, 906 907. UE A 905 communicates data with the first relay 902, UE B 906 communicates data with the second relay 903, and UE C 907 communicates data with the third relay 904. Each of the three relays may communicate directly with the eNodeB 901 or with each other in order to transmit data received from the UEs to the eNodeB 901 as quickly and efficiently as possible.

The way in which the UE establishes communications to the relay nodes may be transparent or non-transparent. When the connection is transparent, it is meant that the UE is not aware that a relay node is involved in its communications with the eNodeB. This is similar to the mode 2 relay in 3GPP LTE Release 10. When the connection is non-transparent, it is meant that the UE is explicitly communicating with a relay node, and may receive acknowledgement messages for retransmission purposes. The existing LTE relay types displayed in FIG. 5 may be extended to relays operating on a device-to-device (D2D) basis as illustrated by FIG. 10.

Figure 10:
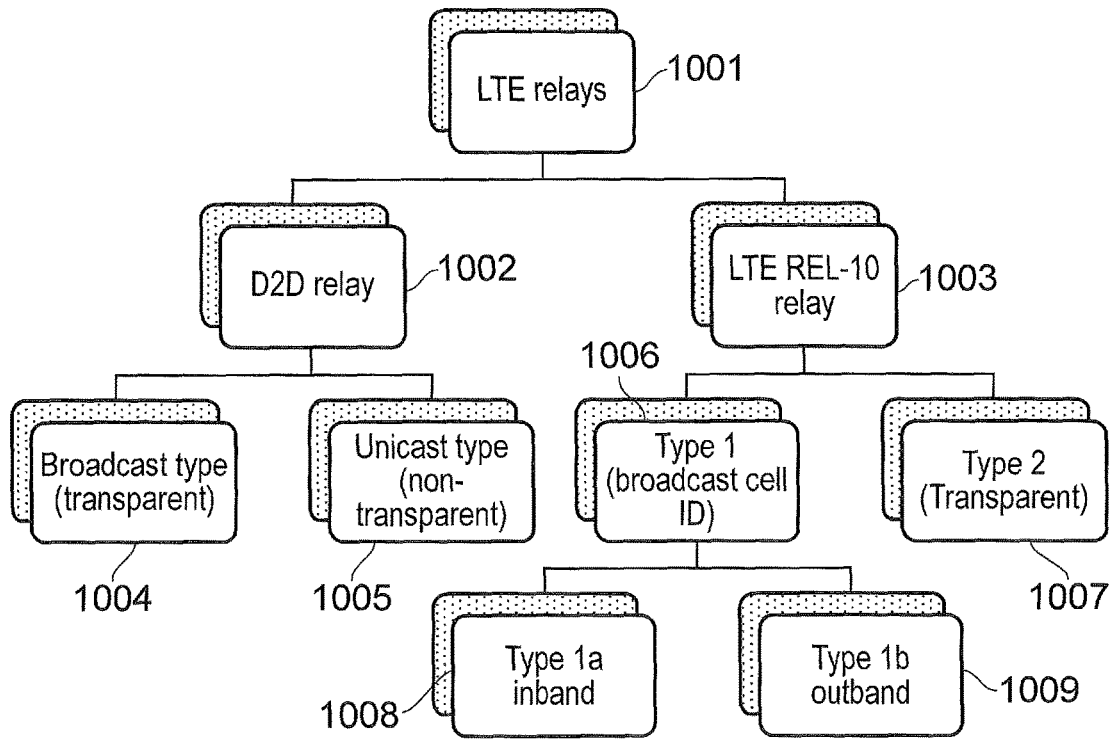
FIG. 10 illustrates an example relay topology in LTE based radio access networks in accordance with the present technique.

As FIG. 10 shows, an LTE relay node 1001 may be, but is not limited to, one of a D2D relay 1002 or a 3GPP LTE Release 10 relay 1003. In the case that the relay node is a D2D relay, the relay node can be further categorised as either of a broadcast type 1004, which is transparent, or a unicast type 1005, which is non-transparent. In the case that the relay node is a 3GPP LTE Release 10 relay 1003, the relay node can be either a Type 1 relay 1006, which has its own cell ID which is broadcast to the UEs around it, or a Type 2 relay 1007, which is transparent to the UEs. Further, in the case of the relay node 1003 being a Type 1 relay 1006 the relay node can be either an inband relay 1008, where the backhaul and access links operate using the same spectrum resources, or an outband relay 1009, where the backhaul link operates in a spectrum separate from that of the access link.

A UE may communicate data to any type of relay, and it may be seen in the architectural sense as an anchor point regardless of whether it is transparent or non-transparent to the UE. It is when the role that the relay has in relation to the specific radio bearer between the UE and the eNodeB is considered that the transparency becomes relevant. Devices in the current 3GPP LTE Release 12 proximity services (ProSe) broadcast messages over the D2D resource, and one or more devices receive the messages. There is no retransmission protocol between the devices, and the transmission thus takes place in a 'best-effort' manner. In some cases, as elaborated below, it may be of benefit to introduce quality control measures between the two end points of a D2D connection. For example, this could involve having a retransmission protocol that ensures the correct receipt of a packet. By default, the end point for such a connection is non-transparent unless some multicast examples are considered, where one negative acknowledgment (NACK) message would cause the transmitter to send the packet again to all of the receivers. According to the example of the present technique an entity sending feedback over a D2D interface to the transmitting device is connected at some protocol layer level above L1 to the transmitter, and thus is visible to it. Accordingly, the entity is non-transparent.

As described in the co-pending European patent applications, namely EP14200168.4, EP15151967.5 and EP15156163.6, the process of network assisted relay discovery and the reporting of inter-node channel quality information is the basis for building the edges that may be chosen to be used for inter-node connections, and for establishing, for example, network coding subgraphs. The inter-node connections which are relevant for forwarding user plane PDUs from a source UE to the eNodeB in uplink, and vice-versa in downlink, constitute look-up tables that the eNodeB provides for the relay nodes. As indicated above, individual look-up tables can be provided for each relay node, which assists the relay node in determining which incoming edges are connected to which outgoing edges, and how the PDUs from the incoming edges can be combined, or indeed not combined. Here this concept of relay look-up tables is extended to cover different end-to-end sessions that pass through a given relay node. The examples given above would clearly use different routes across the relay assisted network and thus assigning one unique look-up table for a relay node would not suffice.

The EPS bearer quality class and the presence of UE capability information at the network controller helps the controller in determining how the PDUs from that UE would be forwarded in the relay assisted network. Different forwarding routes can be addressed by different look-up tables. Clearly, the same inter-node channel quality measurements are relevant regardless of how many look-up tables are established, so this would not introduce any change in how the UEs and relay nodes discover, measure and report intra-node links. It is not expected that there would be several look-up tables per relay node. In one example, a relay node would have two look-up tables. The first of these look-up tables would be used for forwarding packets from MTC UEs, where the incoming packets can be buffered and aggregated without QoS impact. The second of these look-up tables would be used for all of the remaining traffic. In another example, the relay node would further separate sessions that it forwards directly to the eNodeB, which does not necessitate a separate look-up table.

When the UE registers itself under the eNodeB and reports its capability, it is associated with a relay node which has been determined after the relay discovery process. Based on the UE's capability, this relay node will either set up a protocol layer end-to-end connection with the UE or only assist in a transparent fashion. This may be referred to as a mode, which typifies how the relay node communicates with a UE. Additionally, when the look-up tables for relay nodes are set up after the inter-node measurements, the assigned edges in the inter-relay connections may be different depending on which UE the traffic carried towards the eNodeB came from. For example, for the most delay sensitive traffic, the relay node for that particular UE in its incoming edge would have the outgoing edge towards the eNodeB. For another UE, which has an MTC capability, the outgoing edge would be towards the gateway relay node, either directly, or via a number of hops.

Figure 11:
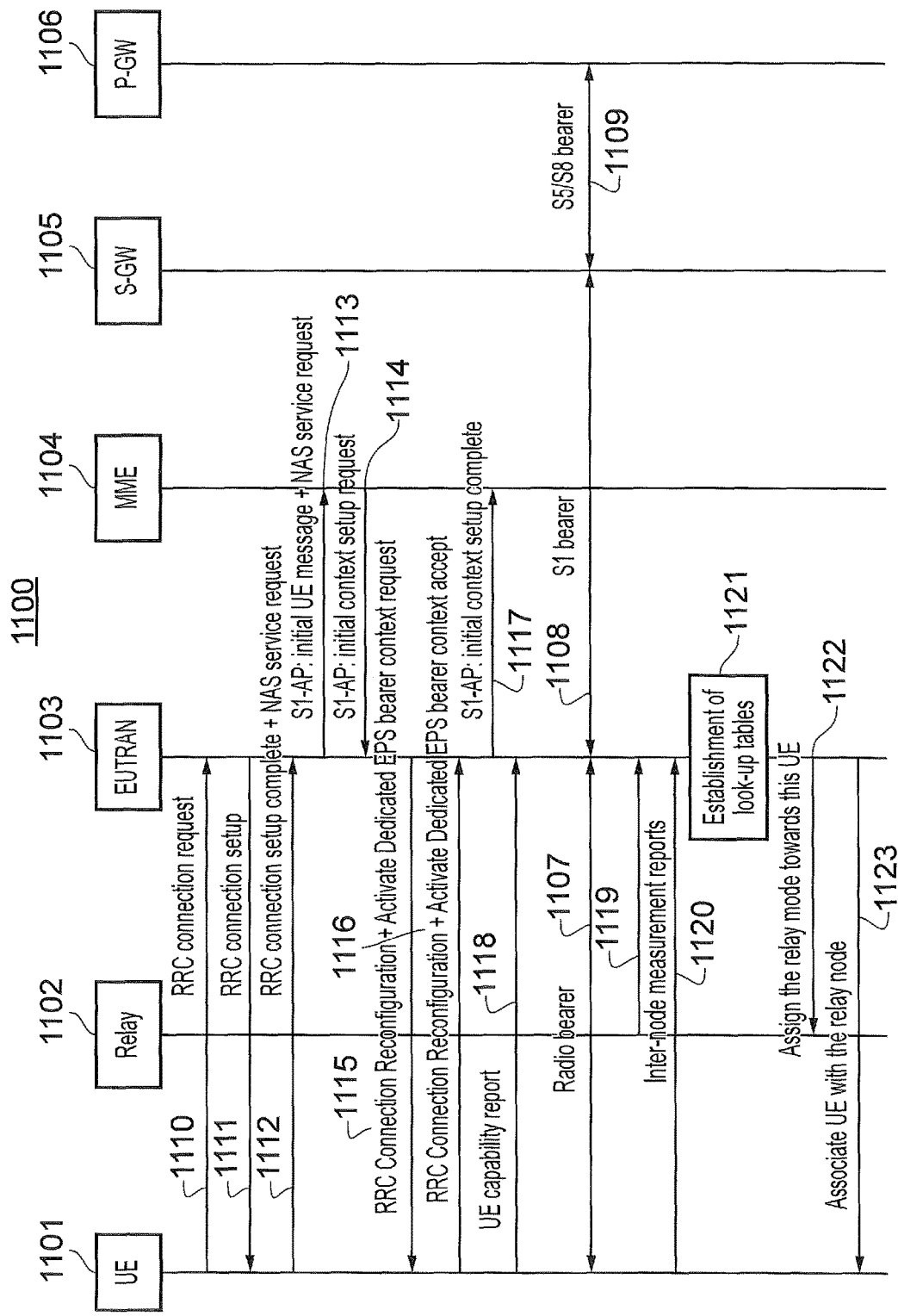
FIG. 11 illustrates an example of reporting of communication terminal capability and quality of service requirements and the impact of this on the mode of the relay node in accordance with the present technique.

FIG. 11 provides an example mobile communications network 1100 in accordance with the present technique, illustrating how the reporting of communication terminal capability and quality of service requirements takes place and the impact of this on the mode of a relay node in the network. The mobile communications network comprises a communications terminal, or UE 1101, a relay node 1102, an eNodeB, or EUTRAN (evolved UMTS [universal mobile telecommunications system] terrestrial radio access network node B) 1103, a mobility management entity (MME) 1104, an S-GW 1105 and a P-GW 1106. The network further comprises an EPS bearer formed from a combination of a radio bearer 1107 which provides connectivity between the UE 1101, the relay node 1102 and the eNodeB 1103, an S1 bearer 1108 which provides connectivity between the eNodeB 1103, the MME 1104 and the S-GW 1105, and S5/S8 bearers 1109, which provide connectivity between the S-GW 1105 and P-GW 1106.

Firstly, the UE 1101 sends the eNodeB 1103 a radio resource control (RRC) connection request 1110, and in response the eNodeB 1103 sets up an RRC connection 1111 with the UE 1101. The UE 1101 reports to the eNodeB 1103 that the RRC connection setup has been completed successfully, and also transmits a non-access stratum (NAS) service request 1112. The eNodeB 1103 then transmits in accordance with the S1 application protocol (S1AP) an initial UE message and NAS service request 1113 to the MME 1104. In response, in accordance with the S1AP the MME 1104 transmits an initial context setup request 1114 to the eNodeB 1103. The eNodeB 1103 transmits to the UE 1101 an RRC connection reconfiguration and activate dedicated EPS bearer context request message 1115, and in response receives an RRC connection reconfiguration and activate dedicated EPS bearer context accept message 1116.

Following this, the eNodeB 1103 communicates to the MME 1104 in accordance with the S1AP a message indicating that the initial context setup is complete 1117, and then receives from the UE 1101 a UE capability report 1118.

The eNodeB 1103 next receives an inter-node measurement report 1119 from the relay node 1102 and an inter-node measurement report 1120 from the UE 1101, and with this information and the capability report, establishes look-up tables 1121 for the network. The eNodeB 1103 then communicates 1122 to the relay node 1102 assigning it towards the UE 1101, and transmits a message 1123 to the UE 1101 associating it with the relay node 1102.

Depending on the EPS quality class indication and UE capability information, a relay node may assume a different set of incoming and outgoing edges, which are indicated in the look-up table provided by the network controller. In addition to the different incoming and outgoing edges, the interaction across the two nodes at the opposite ends of an edge may be set differently. In particular, when aggregating small packets from several devices it may not be efficient to have an end-to-end retransmission protocol between the radio link control (RLC) end points at the device and at the eNodeB. It may be more efficient to acknowledge the transmissions at the relay node with which the UE is associated with, for example, after the first hop. This leaves the aggregation and transmission of transport blocks for the relay network, and reduces the need for the eNodeB to manage the individual UEs.

Clearly, the relay node may assign incoming data across the incoming edges to different outgoing edges, depending on how the transport blocks in a particular session would be treated according to the look-up table for a particular UE capability. It is only necessary for the relay node to know the capability of a UE which is associated with it, since further onwards, the relay chooses a relevant look-up table and indicates in the header information it appends what sessions are aggregated to the overall transmission.

Figure 12:
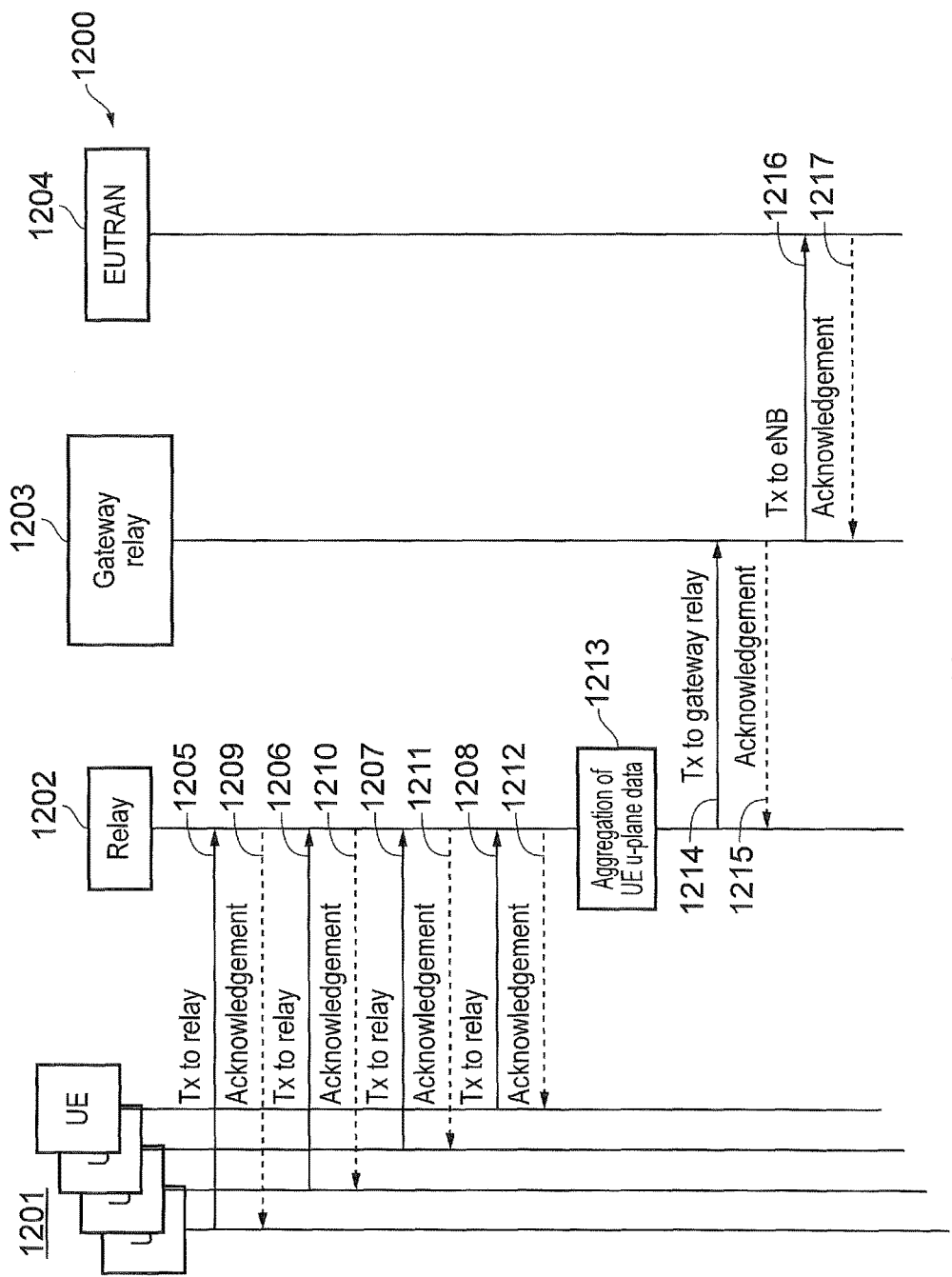
FIG. 12 illustrates an example of clustering of MTC devices and the aggregation of traffic via a gateway node in accordance with the present technique.

FIG. 12 provides an example mobile communications network 1200 in accordance with the present technique, illustrating the clustering of MTC devices and how the aggregation of traffic via a gateway node is organised in accordance with the present technique. The network comprises a cluster of UEs 1201 which may be MTC devices, a relay node 1202, a relay node configured as the gateway relay 1203 and an eNodeB, or EUTRAN 1204. Each of the UEs in the cluster 1201 transmits their individual data 1205 to 1208 to the relay 1202, which responds with an acknowledgement message 1209 to 1212. The relay node 1202 aggregates all of the UE u-plane data it has received 1213 from the cluster of UEs 1201, before transmitting this aggregated data 1214 to the gateway relay 1203 upon predetermined conditions being met. The gateway relay 1203 communicates an acknowledgement message 1215 to the relay node 1202 in response to this, before communicating the aggregated data onwards 1216 to the eNodeB 1204, which further transmits an acknowledgement message 1217 to the gateway relay 1203.

Figure 13:
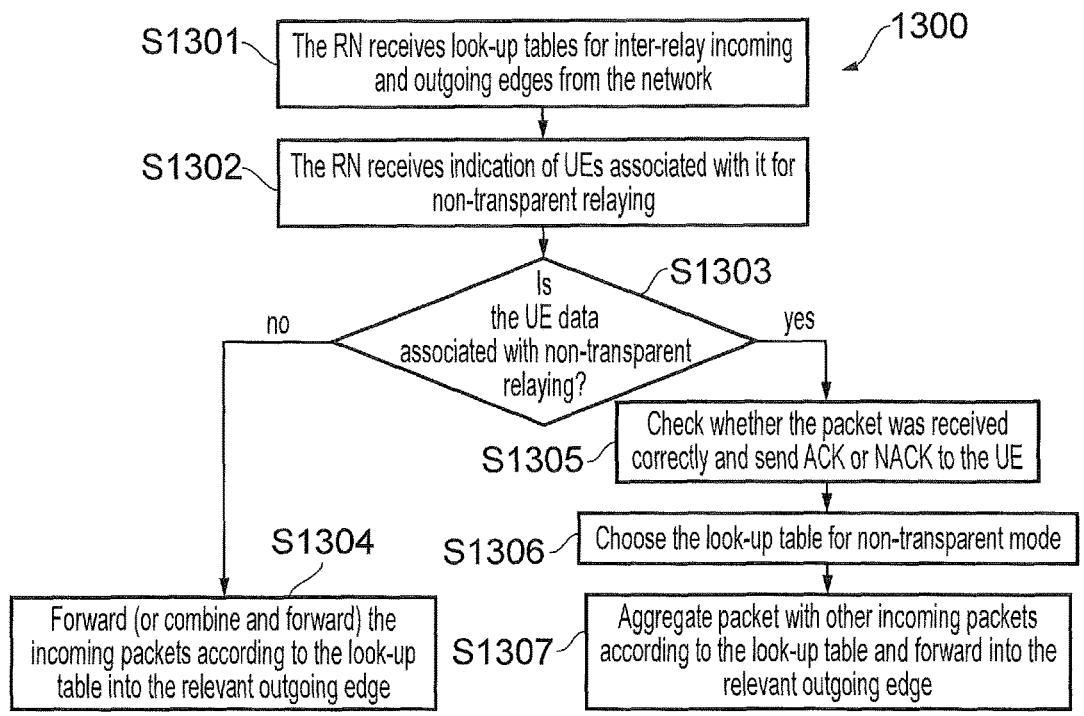
FIG. 13 represents an example flow diagram illustrating an example of a relay node process for determining how to forward incoming data from the communication terminal in accordance with the present technique.

The relay node mode is not an overarching rule that applies to all data that is processed by the relay node. Alternatively, a relay node may, and likely does, deploy more than one mode at the same time, depending on the nature of the incoming data in question. The flow chart of FIG. 13 shows an example of the process 1300 that the relay node follows for UEs at its incoming edges in accordance with the present disclosure.

The process begins with step S1301, with the relay node receiving look-up tables for inter-relay incoming and outgoing edges from the network, and in step S1302, the relay node receives an indication of the UEs associated with it for non-transparent relaying. Now, for any data received by the relay node from a UE, the relay node has to determine whether the data is associated with non-transparent relaying, which it does in step S1303. If the UE data is not associated with non-transparent relaying, the relay node either forwards, or combines and then forwards, the incoming packets according to the look-up table into the relevant outgoing edge, in accordance with step S1304. However, if the UE data is associated with non-transparent relaying, the relay node first in step S1305 checks whether the packet was received correctly, and if so sends an acknowledgement (ACK or NACK) message to the UE. In step S1306, the relay node then chooses the look-up table for non-transparent relaying, and in step S1307, aggregates the data packet with other incoming packets according to the look-up table and forwards the aggregated data into the relevant outgoing edge.

When a UE reports its capability to the network, the network controller determines whether the transmissions from the UE to the eNodeB are assigned to a specific relay node that will take the responsibility of acknowledging and forwarding PDUs from the device. This is the above-mentioned non-transparent mode, where the UE has established a L2 connection with a specific relay node, and is communicating with that relay node. In the case that no relay association is needed, the eNodeB forwards the look-up tables to all of the relay nodes, and any transmissions from the UE are transparently received and forwarded across the relay network to the eNodeB. In most cases the UE also directly transmits in uplink.

A controller according to the present technique may also determine that one relay node should be specified as a gateway through which all the traffic from UEs having a capability and a QoS requirement which can tolerate buffering and delays would be forwarded to the eNodeB. The intended gateway node does not itself have to know that it is acting as a funnel to different radio bearers. It is sufficient that the look-up tables connecting relay nodes to other relay nodes guide the traffic originating from UEs associated with a non-transparent relay towards this specific relay acting as a gateway. Alternatively, the network controller may decide only to use the non-transparent mode at the relay node that is associated with a UE, and allow the bearers to pass through multiple relay nodes to the eNodeB based on whichever combining and routing scheme is seen beneficial. In this case, no gateway relay node is specified.

Figure 14:
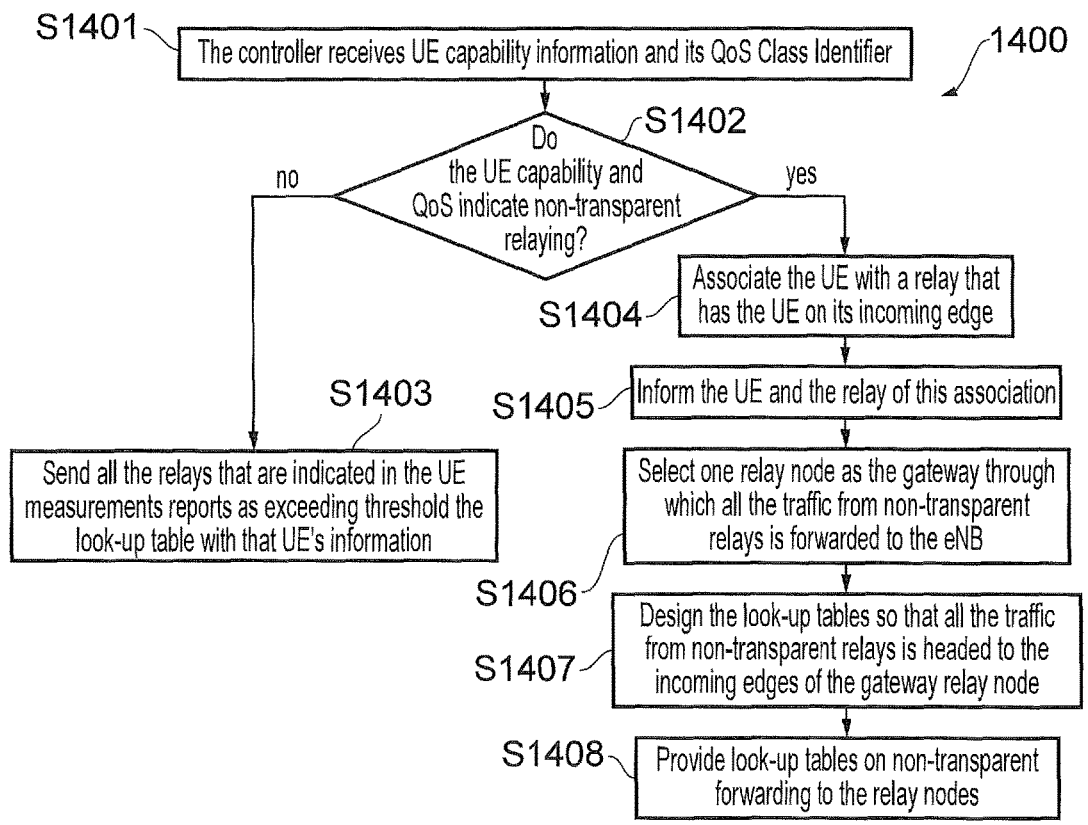
FIG. 14 is a flow diagram illustrating an example of an eNodeB process for determining how to assign look-up tables and forwarding schemes in accordance with the present technique.

The flow chart of FIG. 14 shows in detail an example of the process 1400 that the eNodeB follows in order to determine how to assign look-up tables and forwarding schemes in accordance with the present disclosure. The process begins with step S1401, with the controller (typically the serving eNodeB) receives capability information from the UE as well as its QoS class indicator. The eNodeB analyses this information in step S1402, and determines whether or not they indicate non-transparent relaying. If the eNodeB determines that they do not indicate non-transparent relaying, as laid out in step S1403, it will send the look-up table with the UE's information to all of the relay nodes that are indicated in the UE measurement reports as exceeding a predetermined threshold in terms of link quality and QoS.

However, if the eNodeB determines that the measurement information from the UE does indicate non-transparent relaying, it moves to step S1404, and associates the UE with a relay node which has the UE on an incoming edge, and informs both the UE and the relay node of this association in step S1405. In step S1406, the eNodeB selects one relay node and designates it as the gateway relay through which all of the traffic from the non-transparent relays in the network is aggregated and forwarded through to it. In some embodiments the eNodeB may designate more than one relay node as a gateway relay through which traffic is aggregated and forwarded. This may be the case where relay nodes are in a plurality of spatially separated subgroups with no interconnecting edges between relay nodes in different subgroups. The eNodeB then in step S1407 designs the look-up tables so that all of the traffic from the non-transparent relays is headed to the incoming edges of the gateway relay node, and finally provides these look-up tables on non-transparent forwarding to the appropriate relay nodes in step S1408.

The relay node for the purpose of UE association can be selected from the inter-node and UE-node measurement reports that were provided after the relay node discovery process. As one example, the network controller would decide that the relay node that was reported by a UE as having the best channel quality with the UE would be selected as the node that is associated with the UE. In an additional example, the network controller may associate UEs from a close cluster of devices to different nearby relay nodes in order to avoid overloading a particular relay node, which happens to be closest to the cluster of devices.

Figure 15:
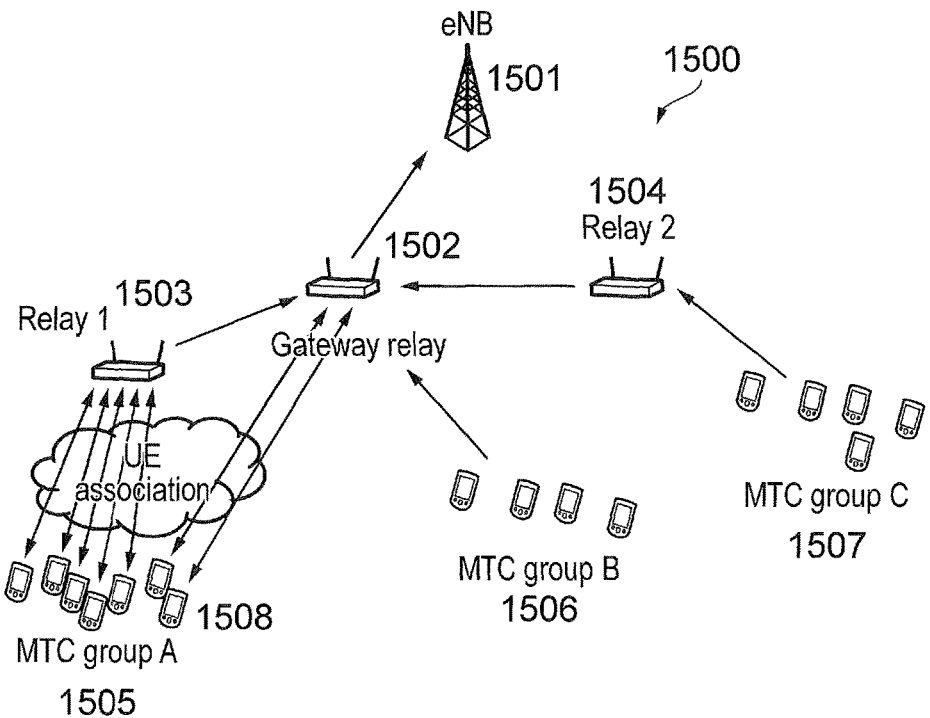
FIG. 15 illustrates an example of an association of communication terminals in a cluster with relay nodes in accordance with the present technique.

FIG. 15 illustrates an example of the association of UEs in a cluster with relay nodes in a mobile communications network 1500 in accordance with the present disclosure. The mobile communications network comprises an eNodeB 1501, a relay node designated as the gateway relay 1502, two additional relay nodes 1503 and 1504, and three clusters of UEs 1505 to 1507, which may be MTC devices. The first of these UE clusters 1505 comprises a further subgroup of two UEs 1508. The UEs 1505 to 1508 are configured to communicate with the relay nodes 1502 to 1504, to which they are associated by the eNodeB 1501, and the additional relay nodes 1503 and 1504 are configured to communicate in turn with the gateway relay 1502, which is configured to further communicate with the eNodeB 1501.

In the example of FIG. 15, the UEs in MTC group B 1506 have been associated with the gateway relay node 1502, the UEs in MTC group A 1505 have been associated with the first relay node 1503, and the UEs in MTC group C 1507 have been associated with the second relay node 1504. However, the eNodeB has associated two UEs 1508 from the UEs in MTC group A 1505 with the gateway relay node 1502, rather than the first relay node 1503, with which the other UEs in MTC group A 1505 have been associated. This may be due to these particular UEs 1508 sharing a better link quality with the gateway relay 1502 than the first relay 1503, or it may have been a decision made by the eNodeB 1501 in order to avoid overloading the first relay 1503. As can be seen, there are a greater number of UEs in MTC group A 1505 than in MTC group B 1506 or MTC group C 1507.

The association may for example be indicated via RRC signalling where an information element provides the discoverable and known ID of a relay node to a UE, and in turn, the identity of the UE to a relay node. Since the UEs and relay nodes searched for nodes with distinct identities during the original discovery process, those identities are already known to the nodes in the relay network, and to the UEs camping under the eNodeB.

The relay node that is associated with a UE establishes an L2 connection with the UE, such that all the medium access control (MAC) PDUs received from the device are checked for errors, and retransmissions are requested when needed. The retransmissions may include both of some type of hybrid automatic repeat request (HARQ) protocol and RLC protocol. The association could also be made with the MAC retransmission protocol only, in which case the RLC layer between the UE and eNodeB would take care of retransmissions, in addition to in sequence delivery and other RLC responsibilities. Naturally, there may be multiple relays connecting the bearer service between the relay that the UE is associated with and the eNodeB, but the protocol layer in those nodes does not connect to the UE, and is not at all visible to it.

Figure 16:
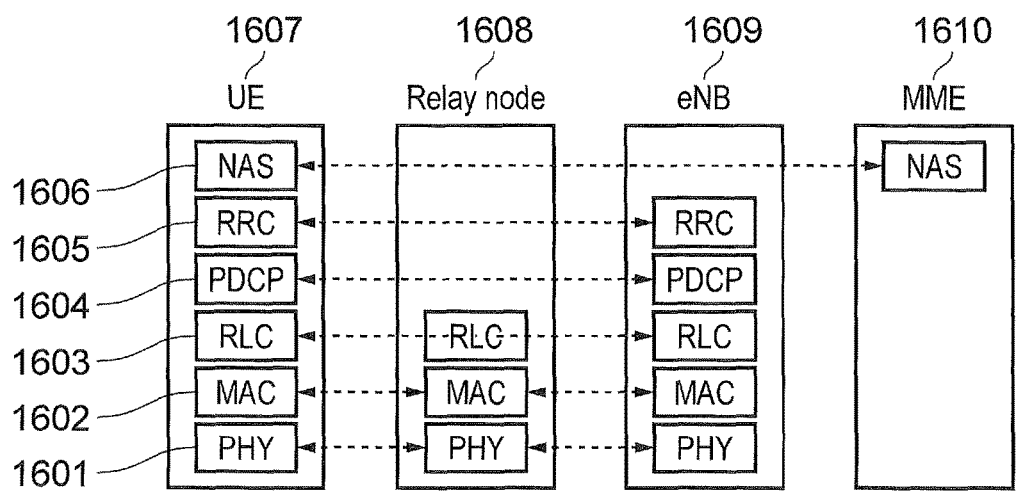
FIG. 16 illustrates an example of the LTE protocol stack with a non-transparent relay node in accordance with the present technique.

FIG. 16 illustrates an example of the LTE protocol stack having a non-transparent relay node, in accordance with the present disclosure. The protocol stack comprises a number of layers, including the physical (PHY) layer 1601, the medium access control (MAC) layer 1602, the radio link control (RLC) layer 1603, the packet data convergence control (PDCP) layer 1604, the radio resource control (RRC) layer 1605, and the non-access stratum (NAS) protocols layer 1606.

FIG. 16 shows these layers and their roles in a mobile communications network comprising a UE 1607, a relay node 1608, an eNodeB 1609 and a mobility management entity (MME) 1610. NAS signalling takes place on the NAS layer 1606 between the UE 1607 and MME 1610, and maintains connectivity and active sessions with the UE 1607 as it moves. RRC signalling takes place on the RRC layer 1605 between the UE 1607 and the eNodeB 1609, includes the broadcast of system information and the establishment, reconfiguration and release of communications bearers. The PDCP layer 1604 exists between the UE 107 and the eNodeB 1609, and provides a number of services and functions including header compression and decompression. The RLC layer 1603 is responsible for the transfer of upper layer PDUs, as well as error correction and retransmission. The RLC layer 1603 exists between the UE 1607, the relay node 1608 and the eNodeB 1609, but as shown in FIG. 16, may not be visible to the relay node 1608. The MAC layer 1602, between the UE 1607, the relay node 1608 and the eNodeB 1609, is responsible for, among other things, mapping between transparent and logical channels, and error correction through HARQ. The final layer displayed in FIG. 16, the PHY layer 1601, exists between the UE 1607, the relay node 1608 and the eNodeB 1609. Data communication takes place over the physical channels of the PHY layer 1601.

From the UE point of view, it does not attempt to connect to a specific relay until it is told to do so. During the relay node discovery and measurement process, it will have detected all of the relay nodes that are near enough to be audible, and has reported on the respective radio link quality. Unless the eNodeB directs the UE via RRC signaling to associate with a specific relay node, the UE communicates directly in both uplink and downlink with the serving eNodeB, and any relay assisted activity is completely transparent to it.

Figure 17:
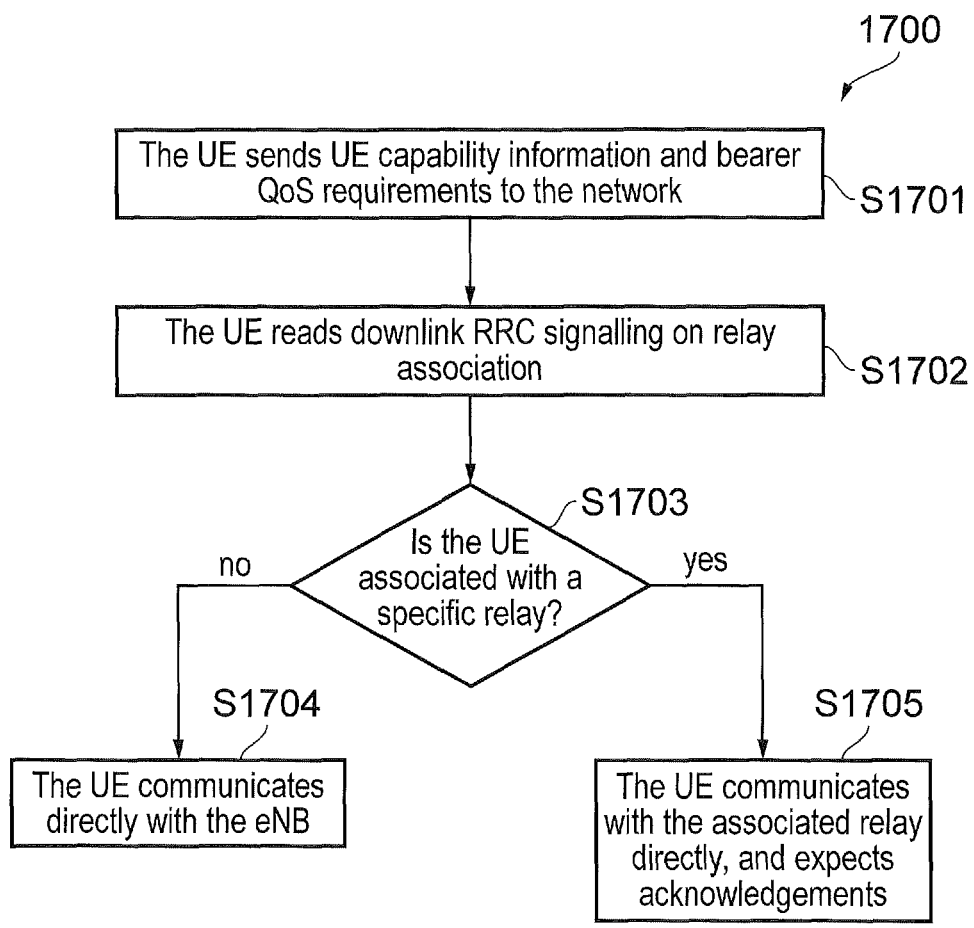
FIG. 17 represents an example flow diagram illustrating a process performed by a communications terminal for determining relay association in accordance with the present technique.

The flow chart of FIG. 17 shows in detail an example of the process 1700 that the UE follows in order to determine whether it associates with relay nodes in accordance with the present disclosure. The process begins with step S1701, with the UE sending its capability information and bearer QoS requirements to the controller, typically the serving eNodeB. In step S1702, the UE reads the downlink RRC signalling on relay association. The UE has to determine in step S1703 whether the eNodeB has associated it with a specific relay, and if so, in step S1704, the UE sets out to communicate directly with the specified relay node. However, if the UE is associated with a specific relay, the UE is configured by the eNodeB to communicate with its associated relay directly, and the UE is additionally configured to expect acknowledgement messages from the associated relay node.

In the present disclosure, the term infrastructure unit aims to refer to any network node in the radio access network which can be found on the part from a source terminal (excluded) to a base station (included). It is noteworthy that although conventional terminals operating in a legacy network are unlikely to be considered as an infrastructure unit, in some examples, such as in some D2D cases, a terminal may sometimes be considered as an infrastructure unit, for example if it relays data or transmissions from other terminals to a base station (directly or indirectly). This term can thus include a base station for a macrocell, a base station for a small cell, a femtocell, a picocell, a relay node (operating in uplink and/or downlink), a terminal providing connectivity to one or more further terminals, etc.

As used herein, transmitting information or a message to an element may involve sending one or more messages to the element and may involve sending part of the information separately from the rest of the information. The number of "messages" involved may also vary depending on the layer or granularity considered.

In accordance with the present disclosure, when an uplink only relay node relays uplink signals, it may transmit relayed signals to the base station via one or more nodes (where the relayed signals are based on the received first uplink signals). For example, the signals may be transmitted to the base station via one or more relay nodes where some or all of them may be operating in one of an uplink-only mode or an uplink-and-downlink mode.

It is noteworthy that even though the present disclosure has been discussed in the context of LTE, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard.

Various further aspects and features of the present technique are defined in the appended claims. Various modifications may be made to the embodiments hereinbefore described within the scope of the appended claims. For example although LTE has been presented as an example application, it will be appreciated that other mobile communications systems can be used for which the present technique can be used.

The following numbered paragraphs provide further example aspects and features of the present technique:

Paragraph 1. A mobile communications system comprising
   a base station, the base station including a transmitter and a receiver, the transmitter being configured to transmit signals in accordance with a wireless access interface to one or more communications terminals, and to transmit signals via the wireless access interface to one or more relay nodes, and the receiver being configured to receive signals via the wireless access interface from the one or more communications terminals, and to receive signals via the wireless access interface from the one or more relay nodes,
   each of the one of more relay nodes includes a transmitter for transmitting signals representing data received from one or more of the communications terminals to the base station or to one of the other relay nodes, or to transmit data received from the base station to one or more of the communications terminals or to one of the other relay nodes, and a receiver for receiving signals representing the data from one or more of the communications terminals for transmission to the base station or to receive signals representing the data for transmitting to the one or more communications terminals, a controller operatively coupled to the base station and configured to receive from the base station measurement information comprising a relative quality of the communication paths measured by one of the communications terminals and a relative quality of the communication paths measured by each of the relay nodes, to determine from the measurement information an association between the communications terminal and one of the relay nodes, to control the communications terminal to transmit the signals representing the data to the associated relay node for transmission to the base station and to receive the signals from the associated relay node which represent the data for transmission to the communications terminal transmitted by the base station, wherein the controller is configured to receive an indication of a quality of service of data to be transmitted via a communications bearer from the communications terminal and the base station, to receive an indication of a capability of the communications terminal to transmit the signals representing the data, to control the communications terminal to transmit the data for the communications bearer to the associated relay node for transmission on to the base station or transmission to the base station via one or more other relay nodes, or to transmit the data to the base station via the wireless access interface, based on the quality of service indicated for the communications bearer and the indicated capability of the communications terminal.

Paragraph 2. A mobile communications system according to paragraph 1, wherein the controller is configured to receive from the base station measurement information comprising a relative quality of the communication paths measured by one or more other communications terminals, to determine from the measurement information an association between one or more the other communications terminals and the associated relay node, to receive an indication of a quality of service of data to be transmitted via a communications bearer from the one or more other communications terminals and the base station, to receive an indication of a capability of the communications terminal to transmit the signals representing the data, to identify, based on the indicated capability of the communications terminal quality of service of data to be transmitted via the communications bearers of the one or more other communications terminals and the communications terminal data which can be transmitted to the base station via the associated relay node, whether the communications terminal should transmit the data for the communications bearer to the associated relay node or whether the communications terminal should transmit the data to the base station via the wireless access interface, and if the data for the communications bearer of one or more of the communications terminal should be transmitted by the associated relay node to aggregate the data from the associated communications terminal and the one or more other associated communications terminals, and upon predetermined conditions being met to transmit the aggregated data to one of the one or more other relay nodes or to communicate the data to the base station via the wireless access interface.

Paragraph 3. A mobile communications system according to paragraph 2, wherein the predetermined conditions include identifying that the quality service requirement for the communications bearer can allow the data is delay tolerant to an effect that the data can be aggregated by the associated relay node.

Paragraph 4. A mobile communications system network according to paragraphs 1, 2 or 3, wherein the controller is configured to control the associated relay node to transmit the data from the communications terminal to one or more of the other relay nodes for transmission to the base station.

Paragraph 5. A mobile communications system according to paragraph 1, wherein the controller is configured to receive an indication of a capability information identifying a capability type of the communications terminal and the one or more other communications terminals, and to control the transmission of the data to the relay node based upon a relative capability of the communications terminal.

Paragraph 6. A mobile communications system according to paragraph 4, wherein the controller is configured to identify, using the measurement information, which of the associated relay node or one or more other relay nodes has a highest quality of communications link to the base station; and to designate the associated relay node or one of the one or more other relay nodes with the highest quality link with the base station as a gateway node, and to control the transmission of the data via the communications bearers from the communications terminals and the one or more other communications terminals to the gateway node, and the transmission of the data from the gateway node to the base station.

Paragraph 7. A mobile communications system according to paragraph 1, wherein the associated relay node and the one or more other relay nodes are configured to transmit, using the transmitter, a cell identifier for identifying the cell for establishing a communications link with the communications terminal, and the associated relay node and the one or more other relay nodes are configured to operate in a first mode in which the associated relay node and the one or more other relay nodes are configured to transmit the cell identifier, the associated relay node and the one or more other relay nodes being thereby non-transparent to the communications terminal, and the associated relay node and the one or more other relay nodes are configured to operate in a second mode in which the associated relay node and the one or more other relay nodes are configured not to transmit the cell identifier, the associated relay node and the one or more other relay nodes being thereby transparent to the communication terminal.

Paragraph 8. A method of managing communications in a cell of a mobile communications network, the method comprising receiving at the base station measurement information comprising a relative quality of the communication paths measured by one of one or more communications terminals and a relative quality of the communication paths measured by each of one or more relay nodes, determining from the measurement information an association between the communications terminal and one of the relay nodes, controlling by the controller the communications terminal to transmit the signals representing the data to the associated relay node for transmission to the base station and to receive the signals from the associated relay node which represent the data for transmission to the communications terminal transmitted by the base station, receiving at the controller an indication of a quality of service of data to be transmitted via a communications bearer from the communications terminal and the base station, to receive an indication of a capability of the communications terminal to transmit the signals representing the data, controlling by the controller the communications terminal to transmit the data for the communications bearer to the associated relay node for transmission on to the base station or transmission to the base station via one or more other relay nodes, or to transmit the data to the base station via the wireless access interface, based on the quality of service indicated for the communications bearer and the indicated capability of the communications terminal.

Paragraph 9. A controller forming part of a mobile communications system, wherein the controller is configured to receive from a base station measurement information comprising a relative quality of the communication paths measured by one of one or more communications terminals and a relative quality of the communication paths measured by each of one or more relay nodes, to determine from the measurement information an association between the communications terminal and one of the relay nodes, to control the communications terminal to transmit signals representing data to the associated relay node for transmission to the base station and to receive the signals from the associated relay node which represent the data for transmission to the communications terminal transmitted by the base station, wherein the controller is configured to receive an indication of a quality of service of data to be transmitted via a communications bearer from the communications terminal and the base station, to receive an indication of a capability of the communications terminal to transmit the signals representing the data, to control the communications terminal to transmit the data for the communications bearer to the associated relay node for transmission on to the base station or transmission to the base station via one or more other relay nodes, or to transmit the data to the base station via a wireless access interface, based on the quality of service indicated for the communications bearer and the indicated capability of the communications terminal.

Paragraph 10. A controller according to paragraph 9, wherein the controller is configured to receive from the base station measurement information comprising a relative quality of the communication paths measured by one or more other communications terminals, to determine from the measurement information an association between one or more the other communications terminals and the associated relay node, to receive an indication of a quality of service of data to be transmitted via a communications bearer from the one or more other communications terminals and the base station;

to receive an indication of a capability of the communications terminal to transmit the signals representing the data, to identify, based on the indicated capability of the communications terminal and the quality of service of data to be transmitted via the communications bearers of the one or more other communications terminals and the communications terminal data which can be transmitted to the base station via the associated relay node, whether the communications terminal should transmit the data for the communications bearer to the associated relay node or whether the communications terminal should transmit the data to the base station via the wireless access interface, and if the data for the communications bearer of one or more of the communications terminal should be transmitted by the associated relay node to control the relay node to aggregate the data from the associated communications terminal and the one or more other associated communications terminals, and upon predetermined conditions being met to transmit the aggregated data to one of the one or more other relay nodes or to transmit the data to the base station via the wireless access interface.

Paragraph 11. A controller according to paragraph 10, wherein the predetermined conditions include identifying that the quality service requirement for the communications bearer can allow the data is delay tolerant to an effect that the data can be aggregated by the associated relay node.

Paragraph 12. A base station including the controller according to paragraphs 9, 10, 11, the base station further including a transmitter and a receiver, the transmitter being configured to transmit signals in accordance with a wireless access interface to one or more communications terminals, and to transmit signals via the wireless access interface to one or more relay nodes, and the receiver being configured to receive signals via the wireless access interface from the one or more communications terminals, and to receive signals via the wireless access interface from the one or more relay nodes.

REFERENCES

[1] 3GPP TR36.872 V12.1.0, "Small cell enhancements for E-UTRA and E-UTRAN—Physical Layer aspects", December 2013.

[2] Holma H. and Toskala A., "LTE for UMTS OFDMA and SC-FDMA Based Radio Access", John Wiley & Sons Limited, January 2010.

[3] 3GPP TS 23.203 V12.7.0, "Policy and charging control architecture", December 2014.

The invention claimed is:

1. A mobile communications system comprising:

a base station;

one or more relay nodes; and one or more communications terminals, wherein the base station includes a transmitter and a receiver, the transmitter being configured to transmit signals in accordance with a wireless access interface to the one or more communications terminals, and to transmit signals via the wireless access interface to the one or more relay nodes, and the receiver being configured to receive signals via the wireless access interface from the one or more communications terminals, and to receive signals via the wireless access interface from the one or more relay nodes, each of the one of more relay nodes includes a transmitter for transmitting data received from one or more of the communications terminals to the base station or to one of the other relay nodes, or to transmit data received from the base station to one or more of the communications terminals or to one of the other relay nodes, and a receiver for receiving data from one or more of the communications terminals for transmission to the base station or to receive data for transmitting to the one or more communications terminals, the base station includes a controller configured to
  receive first measurement information indicating a quality of communication paths measured by a first communications terminal of the one or more communications terminals and second measurement information indicating a quality of communication paths measured by each of the one or more relay nodes,
  determine from the first measurement information and the second measurement information an association between the first communications terminal and a first relay node of the one or more relay nodes,
  control the first communications terminal to transmit data to the first relay node for transmission to the base station and to receive data from the first relay node for transmission to the first communications terminal transmitted by the base station,
  receive a first indication of a capability of the first communications terminal to transmit data, and
  control the first communications terminal to transmit data for the first communications bearer to the first relay node for transmission on to the base station, or to transmit to the base station via one or more relay nodes other than the first relay node, or to transmit data to the base station via the wireless access interface, based on the first quality of service and the first indication of capability.

2. The mobile communications system as claimed in claim 1, wherein the controller is configured to:
  receive third measurement information indicating a quality of communication paths measured by a second communications terminal of the one or more communications terminals,
  determine, from the third measurement information, an association between the second communications terminal and the first relay node,
  receive a second indication of a quality of service of data to be transmitted via a second communications bearer between the second communications terminal and the base station,
  receive a second indication of a capability of the second communications terminal to transmit data,
  identify, based on the second indication of quality and the second indication of capability, whether the second communications terminal should transmit data for the second communications bearer to the first relay node or whether the second communications terminal should transmit data to the base station via the wireless access interface, and
  if data for the first communication bearer and the second communications bearer of the first communications terminal and the second communications terminal should be transmitted by the first relay node
  aggregate data from the first communications terminal and the second communications terminal, and upon predetermined conditions being met,
  transmit the aggregated data to another relay node of the one or more relay nodes or to the base station via the wireless access interface.

3. The mobile communications system as claimed in claim 2, wherein the predetermined conditions include identifying whether a quality of service requirement for the first communications bearer and the second communications bearer allow for a delay tolerance above a predetermined threshold.

4. The mobile communications system network as claimed in claim 1, wherein the controller is configured to control the first relay node to transmit data from the first communications terminal to another relay node of the one or more relay nodes for transmission to the base station.

5. The mobile communications system as claimed in claim 4, wherein the controller is configured to:
  identify, using at least one of the first measurement information and the second measurement information, which of the one or more relay nodes has a highest quality link to the base station;
  designate one of the one or more relay nodes with the highest quality link with the base station as a gateway node, and
  control transmission of data from the one or more communications terminals to the gateway node for transmission to the base station.

6. The mobile communications system as claimed in claim 1, wherein the one or more relay nodes are configured to:
  transmit, using the transmitter, a cell identifier for identifying a cell for establishing a communications link with the one or more communications terminals;
  operate in a first mode in which the one or more relay nodes are configured to transmit the cell identifier so as to be non-transparent to the one or more communications terminals; and
  operate in a second mode in which the one or more relay nodes are configured not to transmit the cell identifier so as to be transparent to the one or more communication terminals.

7. A base station configured to operate in a mobile communications system, the base station comprising:
  a controller configured to
    receive first measurement information indicating a quality of communication paths measured by a first communications terminal of one of one or more communications terminals and second measurement information indicating a quality of communication paths measured by each of one or more relay nodes;
    determine from the first measurement information and the second measurement information an association between the first communications terminal and a first relay node of the one or more relay nodes;
    control the first communications terminal to transmit data to the first relay node for transmission to the base station and to receive data from the first relay node for transmission to the first communications terminal transmitted by the base station;

receive a first indication of a quality of service of data to be transmitted via a first communications bearer between the first communications terminal and the base station;

receive a first indication of a capability of the first communications terminal to transmit; and control the first communications terminal to transmit data for the first communications bearer to the first relay node for transmission on to the base station or transmission to the base station via one relay node other than the first relay node, or to transmit data to the base station via a wireless access interface, based on the first quality of service and the first indicated capability.

8. The base station as claimed in claim 7, wherein the controller is configured to:

receive third measurement information comprising a quality of the communication paths measured by a second communications terminal of the one or more communications terminals;

determine from the third measurement information an association between the second communications terminal and the first relay node;

receive a second indication of a quality of service of data to be transmitted via a second communications bearer between the second communications terminal and the base station;

receive a second indication of a capability of the second communications terminal to transmit;

identify, based on the second indication of quality and the second indication of capability, whether the second communications terminal should transmit data for the second communications bearer to the first relay node or whether the second communications terminal should transmit data to the base station via the wireless access interface, and if data for the first communications bearer and the second communications bearer of the first communications terminal and the second communications terminal should be transmitted by the first relay node to control the relay node to aggregate data from the first communications terminal and the second communications terminal, and upon predetermined conditions being met, transmit the aggregated data to another relay node of the one or more relay nodes or to the base station via the wireless access interface.

9. The base station as claimed in claim 8, wherein the predetermined conditions include identifying whether a quality of service requirement for the first communications bearer and the second communications bearer allow for a delay tolerance above a predetermined threshold.

10. The base station as claimed in claim 7, further comprising:

a transmitter and a receiver, the transmitter being configured to transmit signals in accordance with the wireless access interface to the one or more communications terminals, and to transmit signals via the wireless access interface to the one or more relay nodes, and the receiver being configured to receive signals via the wireless access interface from the one or more communications terminals, and to receive signals via the wireless access interface from the one or more relay nodes.

11. A communications terminal for communicating data via a mobile communications network, the communications terminal comprising:

a transmitter configured to transmit data to a base station or one or more relay nodes;

a receiver configured to receive data from one or more of the relay nodes or to receive data from the base station; and a controller configured in combination with the transmitter and the receiver to transmit to the base station measurement information indicating a quality of communication paths measured by the communications terminal;

receive from the base station an indication of a first relay node of the one or more relay nodes associated with the communications terminal to which the communications terminal transmits data for the first relay node to transmit to the base station;

transmit to the base station an indication of a quality of service which the communications terminal requires for a communications bearer for communicating data via the mobile communications network;

receive from the base station an indication that the communications terminal should either transmit data to the first relay node, for the first relay node to transmit data to the base station, or to transmit data to the base station via the wireless access interface; and in response to the received indication, transmit data for the communications bearer to the first relay node or to transmit data to the base station via a wireless access interface, based on the quality of service indicated for the communications bearer.

* * * * *